United States Patent
Kaemming et al.

(10) Patent No.: US 6,494,034 B2
(45) Date of Patent: Dec. 17, 2002

(54) PULSED DETONATION ENGINE WITH BACKPRESSURE

(75) Inventors: Thomas A. Kaemming, Florissant, MO (US); Paul G. Willhite, Maryland Heights, MO (US)

(73) Assignee: McDonnell Douglas Corporation, St. Louis, MO (US)

( * ) Notice: Subject to any disclaimer, the term of this patent is extended or adjusted under 35 U.S.C. 154(b) by 0 days.

(21) Appl. No.: 10/008,103

(22) Filed: Nov. 13, 2001

(65) Prior Publication Data

US 2002/0059793 A1 May 23, 2002

Related U.S. Application Data

(62) Division of application No. 09/354,218, filed on Jul. 15, 1999, now Pat. No. 6,347,509.

(51) Int. Cl.[7] ................................................. F02K 5/02
(52) U.S. Cl. ............................................................ 60/248
(58) Field of Search ........................ 60/247, 248, 249, 60/39.76, 39.77, 39.78, 39.79, 39.8

(56) References Cited

U.S. PATENT DOCUMENTS

| | | | |
|---|---|---|---|
| 4,708,159 A | * 11/1987 | Lockwood | 137/340 |
| 4,741,154 A | 5/1988 | Eidelman | 60/39.34 |
| 4,767,313 A | * 8/1988 | Lockwood | 431/11 |
| 5,345,758 A | 9/1994 | Bussing | 60/39.38 |
| 5,353,588 A | 10/1994 | Richard | 60/39.38 |
| 5,473,885 A | 12/1995 | Hunter, Jr. et al. | 60/204 |
| 5,494,004 A | 2/1996 | Hunter, Jr. | 122/395 |
| 5,513,489 A | 5/1996 | Bussing | 60/39.38 |
| 5,542,247 A | 8/1996 | Bushman | 60/203.1 |
| 5,546,744 A | 8/1996 | Winfree et al. | 60/247 |
| 5,557,926 A | 9/1996 | Hunter, Jr. et al. | 60/247 |
| 5,579,633 A | 12/1996 | Hunter, Jr. et al. | 60/204 |
| 5,615,548 A | 4/1997 | Winfree et al. | 60/39.78 |
| 6,308,740 B1 | * 10/2001 | Smith | 137/892 |

OTHER PUBLICATIONS

B.V. Voitsekhovskii, "Maintained Detonations", *Fluid Mechanics*, Sep. 14, 1959, pp. 1207–1209.

J.A. Nicholls and R.E. Cullen, "The Feasibility Of A Rotating Detonation Wave Rocket Motor", *Technical Documentary Report No. AF 04(611)–8503*, Apr., 1964, pp. 1–176 plus 68 figures.

J.A. Nicholls, R.E. Cullen, and K.W. Ragland, "Feasibility Studies Of A Rotating Detonation Wave Rocket Motor", *J Spacecraft*, Jun., 1955, pp. 1–6.

T.C. Adamsson, Jr. and G.R. Olsson, "Performance Analysis Of A Rotating Detonation Wave Rocket Engine", *Astronautical Acta*, Jan., 1967, pp. 405–415.

(List continued on next page.)

*Primary Examiner*—Ehud Gartenberg
(74) *Attorney, Agent, or Firm*—Bryan Cave LLP

(57) ABSTRACT

A pulsed detonation engine having an initiator tube fueled with an enhanced fuel mixture is configured in fluid communication with a detonation chamber via a divergent inflow transition section. The divergent inflow transition section has a diverging contoured shape having a rate of divergence continuously dependent upon the diameter of the tube, the critical diameter of the enhanced fuel mixture within the tube and the cross-sectional area of the detonation chamber. The inflow transition section, which may have a stair-step configuration, includes a plurality of fuel and/or air ports to permit the fuel and air to be injected through the transition section and into the detonation chamber. The pulsed detonation engine may optionally include a volume of ejector/bypass air surrounding the detonation chamber, which captures the detonation engine exhaust and mixes the exhaust with the ejector air, and a back pressure device for feeding dynamic pressure ejector air to the interior of the detonation chamber near its outlet end.

8 Claims, 19 Drawing Sheets

OTHER PUBLICATIONS

Brian D. Edwards, "Maintained Detonation Waves In An Annular Channel: A Hypothesis Which Provides The Link Between Classical Acoustic Combustion Instability And Detonation Waves", *AIAA*, 1977, pp. 1611–1619.

T. Bussing and G. Pappas, "An Introduction To Pulse Detonation Engines", *AIAA* 94–0263, 1964, pp. 1–14.

Thomas Bussing and George Pappas, "Pulse Detonation Engine Theory And Concepts", *AIAA*, 1995, pp. 421–473.

T.E. Bratkovich and T.R.A. Bussing, "A Pulse Detonation Engine Performance Model", *AIAA* 95–3155, 1995, pp. 1–15.

Shmuel Eidelman, Xiaolong Yang, and Isaac Lottati, "Pulsed Detonation Engine: Key Issues", *AIAA* 95–2754, 1995, pp. 1–10.

T.R.A. Bussing, "A Rotary Valve Multiple Pulse Detonatin Engine", *AIAA* 95–2577, 1995, pp. 1–14.

J.B. Hinkey, T.R.A. Bussing, and L. Kaye, "Shock Tube Experiments For The Development Of A Hydrogen–Fueled Pulse Detonation Engine", *AIAA* 95–2578,1995, pp. 1–18.

J. Sterling K. Ghorbanian, J. Humphrey, T. Sobota, and D. Pratt, "Numerical Investigations Of Pulse Detonation Wave Engines", *AIAA* 95–2479, 1995, pp. 1–9.

Shmuel Eidelman, "Pulse Detonation Engine: A Status Review And Technology Development Road Map", *AIAA* 97–2740, 1997, pp. 1–10.

T.E. Bratkovich, M.J. Aarnio, J.T. Williams, and T.R.A. Bussing, "An Introduction To Pulse Detonation Rocket Engines", *AIAA* 97–2742, 1997, pp. 1–11.

J.–L. Cambier and J.K. Tegner, "Strategies For PDE Performance Optimization", *AIAA* 97–2743, 1997, pp. 1–19.

P.P. Lo and D.E. Gonzalez, "Development Of A Fuel Injction System For A High Frequency Pulse Detonation Engine", *AIAA* 97–2744, 1997, pp. 1–7.

W.S. Stuessy and D.R. Wilson, "Influence Of Nozzle Geometry On The Performance Of A Pulse Detonation Engine", *AIAA* 97–2745, 1997, pp. 1–10.

J.B. Hinkey, J.T. Williams, S.E. Henderson, and T.R.A Bussing, "Rotary–Valved, Multiple–Cycle, Pulse Detonation Engine Experimental Demonstration", *AIAA* 97–2746, pp. 1–18.

T.R.A. Bussing, T.E. Bratkovich, and J.B. Hinkey, Jr., "Practical Implementation Of Pulse Detonation Engines", *AIAA* 97–2748, 1997, pp. pp. 1–13.

Houshang B. Ebrahimi and Charles L. Merkle, "A Numerical Simulation Of The Pulse Detonation Engine With Hydrogen Fuels" *AIAA* 99–2818, 1999, pp. 1–11.

Nelson Butuk, Fangrong Ye, Ziaul Huque, and D. Lynch, "CFD Simulations Of A Novel Multi–Tube Pulse Detonation Engine Inlet Concept", *AIAA* 99–2240, 1999, pp. 1–11.

C.M. Brophy and D.W. Netzer, "Effects Of Ignition Characteristics And Geometry On The Performance Of A JP–10/$O_2$ Fueled Pulse Detonation Engine", *AIAA* 99–2635, 1999, pp. 1–7.

J.–L. Cambier, "Preliminary Modeling Of Pulse Detonation Rocket Engines", *AIAA* 99–2659, 1999, pp. 1–18.

Dominique Bouchaud, Bernard Forrat, Dominique Piton, and Pierre Yvart, "Aerospatiale and Celerg Investigations On Pulse Detonation Propulsion", *AIAA* 99–2658, 1999, pp. 1–11.

Dr. Raymond Edelman and Robert E. Henderson, "Pulse Detonation Wave Engine", AGAFB Report 824, date unknown, pp. 1–4.

A.A. Borisov, S.V. Khomik, V.R. Mikhalkin, E.V. Saneev, "Critical Energy of Direct Detonation Initiation in Gaseous Mixtures", *Progress In Astronautics And Aeronautics*, vol. 133, 1999, pp. 141–155.

D. Helman, R.P. Sleeve, and S. Eidelman, Detonation Pulse Engine, AIAA/ASME/SAE/ASEE 22nd Joint Propulsion Conference, Jun. 16–18, 1986, Huntsville, Alabama, p. 1–23.

\* cited by examiner

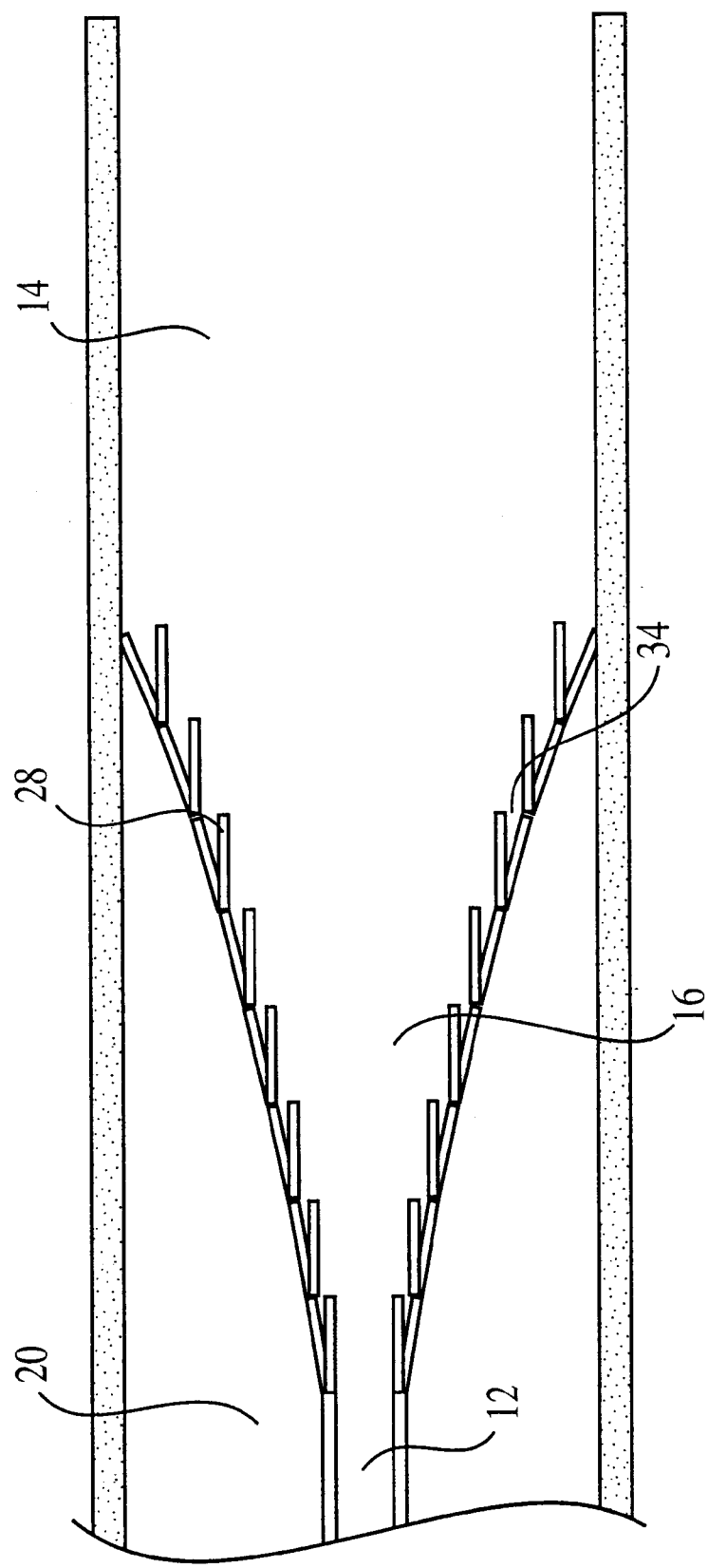

SECTION A-A
FROM FIG. 6a

SECTION A-A
FROM FIG. 6a

PULSED DETONATION ENGINE WITH BACKPRESSURE

CROSS-REFERENCE TO RELATED APPLICATIONS

This is a divisional application of Ser. No. 09/354,218, filed on Jul. 15, 1999, now U.S. Pat. No. 6,347,509.

FIELD OF THE INVENTION

The present invention relates generally to propulsion systems and, more particularly, to pulsed detonation engines used, for example, in aircraft and missiles.

BACKGROUND OF THE INVENTION

In a conventional pulsed detonation engine ("PDE"), a detonation chamber is filled with a fuel-air mixture capable of sustaining a detonation. A detonation wave is initiated in a small initiator tube connected to the detonation chamber and is introduced into the chamber. The detonation wave processes all of the fuel-air mixture within the detonation chamber as it propagates down the longitudinal axis of the chamber at supersonic speeds, resulting in high temperature, high pressure combustion gas that provides energy to drive the wave. The detonation wave eventually exhausts through an open end of the chamber at high velocity. As the detonation wave propagates through the chamber, a high pressure gas develops behind the wave that pushes against the rear surface of the detonation chamber and produces thrust. The detonation chamber is then refreshed with new air and fuel, pushing out the remaining exhaust products, and is prepared for another cycle.

Conventional PDEs heretofore known are generally incapable of generating sufficient thrust to sustain flight throughout the entire envelope of modem aircraft and missiles. The thrust performance for a fixed volume PDE may generally be increased in two ways—by increasing the repetition rate (i.e., the frequency of the pulses or engine cycles) or by increasing the impulse (thrust) per pulse. The pulse frequency is typically limited by the time required to refresh the detonation chamber with oxidizer (air) and fuel between each cycle, and is generally limited by the available cross-sectional area of the fuel and air inflow ports and the air and fuel flow rates. The maximum refresh flow rate may further be limited by choking at the minimum inflow area, i.e., limited by the physical dimension of the ports or tubing used in the refresh path. By developing a method to increase the minimum inflow area, a decrease in the amount of time required between cycles of a PDE can be achieved, thus increasing the thrust performance of the PDE.

In conventional PDEs, the cycle efficiency or impulse per pulse (and therefore, fuel efficiency) reflects the extent to which the inflow total pressure is converted to increase the pre-detonation pressure within the chamber in addition to reflecting the efficiency with which the thermodynamic energy of the high pressure detonated gas is converted into flow kinetic energy as it exits the engine. The greater the temperature of the combustion gases in the chamber, the higher the temperature of the exhaust gases as they exit the engine. This latent heat represents a loss in thermodynamic efficiency of the engine. Reduction of the temperature of the combustion gases while maintaining total cycle energy would improve the engine thermodynamic efficiency.

Another difficulty encountered with conventional PDEs is in the ability to efficiently and effectively transition the detonation wave from the initiator tube into the detonation chamber. The typical initiator tube used in a pulsed detonation engine is an elongated tube having a small diameter (e.g., one inch,) circular cross-section filled with a fuel-oxidizer mixture that is enhanced (e.g., by the use or addition of oxygen) to have a small critical diameter. The critical diameter of a detonable mixture is defined as the minimum diameter of an initiator tube required for the exiting detonation to directly transition into a spherical detonation wave in an open space filled with the same mixture. In a conventional PDE, the initiator tube is connected on one end to the interior of the detonation chamber. The downstream detonation chamber has a larger cross-sectional area and volume as compared to the initiator tube and conventionally contains fuel and air to power the detonation wave as it propagates through the chamber. The ability of the detonation wave to successfully transition from the initiator tube into the detonation chamber is dependent upon a number of factors, including the critical diameter of the enhanced fuel and oxidizer mixture contained in the initiator tube, the internal diameter of initiator tube, and the cross-sectional area of the detonation chamber. Generally, the larger the diameter of the initiator tube, the easier it will be for the detonation wave to transition from the tube into the detonation chamber having a larger cross-sectional diameter. However, as the diameter of the initiator tube is increased, the length of the tube must be proportionately increased to permit the spark-initiated flame in the tube to transition from deflagration (i.e., subsonic combustion) to detonation, resulting in an overall increase in the size and weight of the PDE. Therefore, it is preferable to maintain the diameter of the initiator tube as small as possible. However, it becomes increasingly difficult to transition a detonation wave into a downstream detonation chamber from a small initiator tube. One proposed solution for transitioning the detonation wave from an initiator tube into a larger detonation chamber is to use a divergent section that connects the initiator tube to the larger, constant cross-sectional area detonation chamber. However, conventional transition sections require large amounts of oxidizer to maintain the detonation wave until it finally reaches the full detonation chamber. This additional oxidizer flow equates to a lowering of the cycle efficiency of the PDE.

Thus, there is a continuing need for an efficient and effective pulsed detonation engine having increased efficiency over prior known PDEs. Preferably, the PDE would be configured to properly transition the wave (i.e., maintain the detonation wave from the initiator tube into the detonation chamber) with a low amount of enhanced fuel/air mixture. The preferred PDE would also have features designed to increase the thrust performance by decreasing the amount of time required to refresh the engine and/or increasing the amount of incremental thrust delivered each cycle.

SUMMARY OF THE INVENTION

A preferred pulsed detonation engine having these features and satisfying these needs has now been developed. In accordance with the presently preferred invention, an initiator tube is fueled with an enhanced fuel and oxidizer mixture having an associated small critical diameter and is in fluid communication with a detonation chamber via a divergent inflow transition section. The divergent inflow transition section has a diverging contoured shape having a rate of divergence continuously dependent upon the diameter of the tube, the critical diameter of the enhanced fuel mixture within the tube and the cross-sectional area of the detonation chamber. The preferred PDE also includes means for admitting a detonable fuel-air mixture into the transition section and the detonation chamber through the divergent inflow transition section. The preferred PDE also has means for igniting the enhanced fuel mixture contained within the initiator tube to create a detonation wave propagating through the initiator tube and transitioning over the divergent inflow section into the detonation chamber. The detonation wave generates a high pressure gas behind the wave that expands and produces thrust in a direction opposite to the exhaust.

In a preferred embodiment of the presently preferred PDE, the inflow transition section includes a plurality of openings to permit the fuel and air to enter into the detonation chamber. These openings may have a stair-step configuration or are configured as a continuous, porous surface. The openings are distributed along the inflow transition section so as to both admit flow during the refresh phase, and to enable successful transition during the detonation phase. An air induction valve is located upstream of the inflow transition section. This valve is opened during the refresh portion of each cycle, admitting the fresh charge of fuel and air. The valve closes prior to the passage of the detonation wave, holding in the detonation pressure and sustaining the thrust of the engine.

Alternatively, the air induction valve may be an integral part of the inflow transition section. In this configuration, the internal contour of the air induction valve, when closed, enables successful transition during the detonation phase. During the refresh phase, the valve opens to admit the fresh fuel-air mixture into the transition section and chamber.

In another embodiment, the pulsed detonation engine further includes an ejector/bypass flow volume. This mass of unfueled ejector/bypass air is contiguous to and in fluid communication with the fueled detonation mixture. The detonated fuel-air mixture expands, transferring energy from the high pressure, high temperature fueled flow to the unfueled ejector/bypass air, thus increasing the amount of energy from the detonation wave that is converted into thrust. The volume of the ejector/bypass air may be arranged in series with the fueled air (i.e., in front of or behind the fueled volume along the axis of travel of the detonation wave) or the bypass air may lie parallel to (i.e., to the side of or surrounding) the fueled volume. The volume of ejector/bypass air is produced and controlled either by the use of additional air induction valves, or by controlling the location and timing of fuel injection.

In another embodiment, the pulsed detonation engine includes a back pressure device which feeds inlet plenum air into the detonation chamber near its outlet end. Aerodynamic interactions with the back pressure flow slow the chamber refresh flow rate and thus back pressure the chamber. This improves the conversion of chamber inflow total pressure into pre-detonation chamber pressure, increasing impulse per pulse, and thus improving engine efficiency.

BRIEF DESCRIPTION OF THE DRAWINGS

These and other features, aspects, and advantages of the present invention will become better understood with regard to the following description, appended claims, and accompanying drawings wherein:

FIG. 5b is diagrammatic illustration of one presently preferred version of the transition section of the pulsed detonation engine having a plurality of air and fuel ports with integral air valves shown therein;

FIG. 6b is another view of the preferred axisymmetric stair-step transition section, taken along line A—A of FIG. 6a;

FIG. 6c is another view of the preferred two-dimensional stair-step transition section, taken along line A—A of FIG. 6a;

FIG. 8 is a pressure contour plot as the detonation wave enters the transition region of FIG. 6a;

FIG. 9 is a pressure contour plot after the detonation wave has traversed through the transition region of FIG. 6a;

These drawings are provided for illustrative purposes only and should not be used to unduly limit the scope of the present invention.

DETAILED DESCRIPTION OF THE INVENTION

Figure 1:
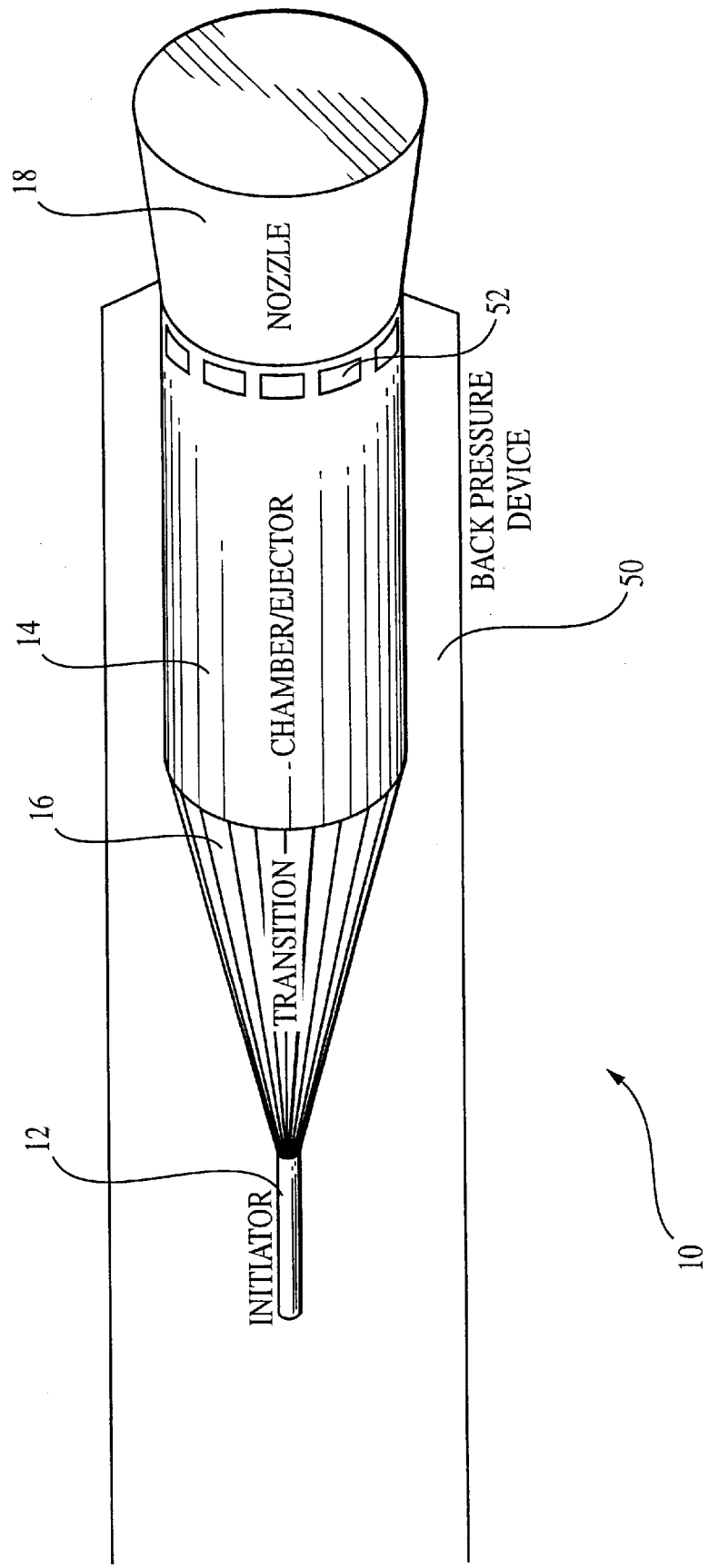
FIG. 1 is a diagrammatic illustration of the presently preferred pulsed detonation engine.

Referring now to FIG. 1, therein is illustrated a pulsed detonation engine 10 according to present invention. The PDE 10 comprises, as its principal elements, an initiator tube 12 and a detonation chamber 14. The detonation chamber 14 preferably has a divergent transition section 16 connecting the initiator tube 12 and the chamber 14 so that the interior of the tube 12 is in fluid communication with the interior of the chamber 14. The engine 10 also includes a plurality of openings to allow air to flow into detonation chamber 14 as described below. The openings form the transition section 16 and may include the air induction valves (not shown) to control the amount and timing of the flow of air. These valves may, alternatively, exist separately, upstream of the transition section 16.

Figure 2:
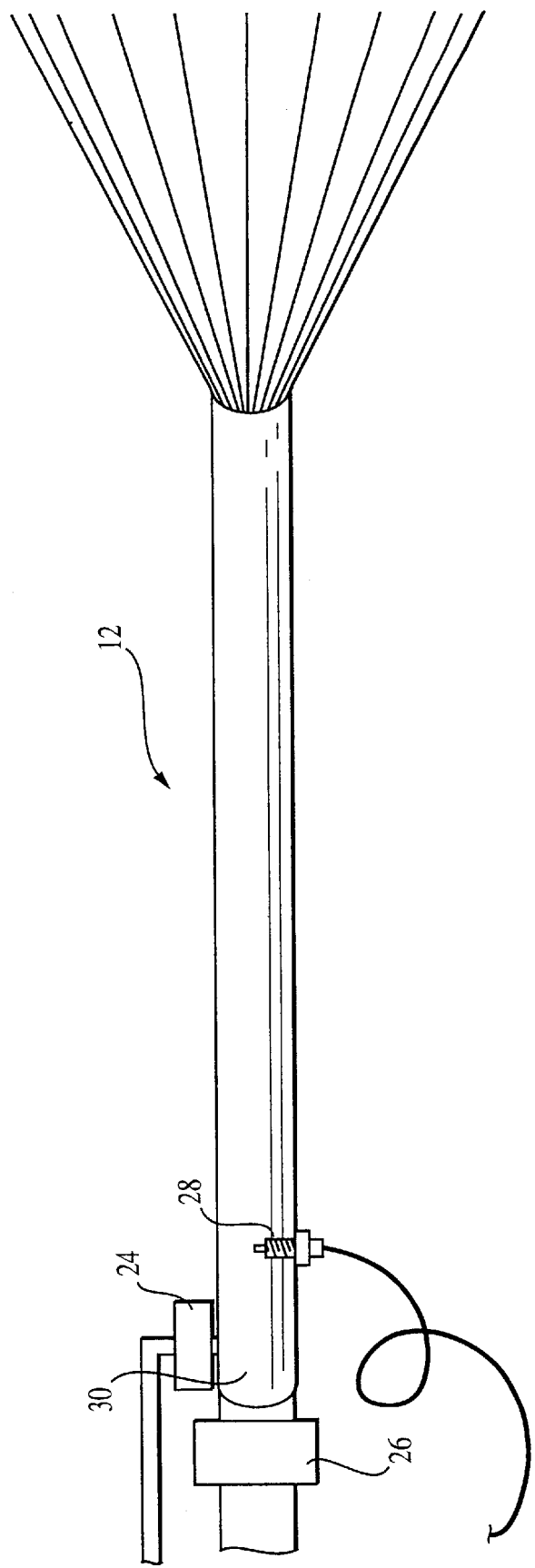
FIG. 2 is a diagrammatic illustration of the preferred initiator tube.

The initiator tube 12 is the source for the detonation wave, which propagates through the PDE 10. Referring to FIG. 2, the initiator tube 12 has an inflow, upstream end 30, into which an enhanced fuel and oxidizer mixture is preferably injected during the refresh cycle. For example, initiator tube 12 may contain a fuel valve 24 connected to a fuel supply (not shown) and an oxidizer valve 26, connected to a conventional air supply (also not shown). Preferably, as discussed below, the oxidizer flowing into the initiator tube 12 through the oxidizer valve 26 during the refresh cycle is oxygen-enriched. Enriching air, for example, with oxygen, increases the chemical potential of the air as an oxidizer. Thus enriched, the fuel and air mixture is enhanced, resulting in lower spark energy required and, more importantly, a reduced critical diameter. The reduced critical diameter, in turn, permits smaller initiators and more rapid transition of the detonation. The fuel source may be any conventional fuel, which when sparked in the presence of an oxidizer produces a deflagration, and which, under proper conditions, transitions into a detonation wave. Preferred fuels include hydrogen, ethylene, propane, gasoline and kerosene based fuels such as jet fuels (e.g., Jet Fuel A, JP-8, etc.). The fuel and oxidizer mix within the initiator tube 12 and produce an enhanced fuel and oxidizer mixture having an associated small critical diameter.

The initiator tube 12 further includes a means for igniting the mixture, such as, for example, a conventional spark plug 28 connected to an electrical source. Preferably, the fuel valve 24 and the spark plug 28 are spaced sufficiently apart, for example, between 6 to 12 inches, to prevent flashback onto the valve 24.

Preferably, the initiator tube 12 has a length sufficient to permit a transition from deflagration to detonation, but also sufficiently short so as to minimize the transition length and to operate at as high a frequency as possible. Shortening the initiator tube 12 also allows for reduced weight of the overall PDE 10, and the volume of the tube 12, important because of the oxygen enriched air typically used in the enhanced fuel mixture. The length of initiator tube 12 is dependent on the amount of oxygen added to the enhanced fuel mixture. For example, if the mixture is enriched with 40% or more oxygen, then the initiator tube 12 may be short (as short as one foot). By comparison, if the mixture is unenriched, then the length of the initiator tube 12 must be increased to more than four feet, to achieve the deflagration to detonation transition. A longer tube lowers the overall operating frequency of the PDE 10 (due to the amount of time required to refresh the tube with enhanced fuel and oxidizer mixture before initiating the next cycle) and increases the overall weight and volume of the engine 10.

To maintain a detonation wave propagating through the initiator tube 12, the minimum diameter (D) of the tube 12 must be larger than a given diameter, which may, as is known, be calculated based upon the enhanced fuel and oxidizer mixture used in, and the pressure inside of, the tube 12. This minimum diameter of the initiator tube 12 is related to an experimentally determined detonation cell size, $\lambda$, by $D=\lambda/\pi$. If the diameter of the initiator tube is smaller than D, the wall effects, especially heat transfer, become dominant and remove energy from the detonation. This loss of energy quickly reduces the detonation to a deflagration.

Also, a planar detonation wave exiting from a cylindrical initiator tube and entering an infinite volume of fuel and oxidizer mixture will continue as a spherical supersonic detonation provided that the diameter of the initiator tube exceeds a critical diameter $d_{crit}$. If the diameter of initiator tube 12 is smaller than $d_{crit}$, then the rarefaction waves generated at the exit of the tube propagate radially inward and reduce the pressure behind the spherically expanding wave too fast, thereby reducing the chemical reaction rates and decoupling the reaction zone from the shock, typically reducing the detonation to a deflagration. As is known, the critical diameter of a mixture is a function of the fuel and oxidizer in the mixture and is related to the reaction rate and energy release of the detonation flowing through a particular mixture. The critical diameter, $d_{crit}$, for several variations of fuels (e.g., ethylene, hydrogen, gasoline) mixed in air and at a given pressure and oxygen enhancement are known and may be represented as $d_{crit} \sim 13\lambda$. Thus, the minimum diameter of the initiator tube 12 for maintaining a detonation is $D=d_{crit}/13\pi$.

The detonation chamber 14 contains the majority of the working volume of the PDE 10. The hollow interior of the detonation chamber 14 is in fluid communication with the initiator tube 12, through a divergent transition section 16. The exterior shape of the detonation chamber 14 may be any of a variety of shapes including circular, elliptical, super elliptical and ogive. The detonation chamber 14 has a longitudinal axis extending from its upstream end (connected to the transition section 16) to its downstream end. Preferably, the detonation chamber 14 is fueled with oxidizer and fuel, as described below.

Preferably, the detonation chamber 14 has a structure and is formed from materials necessary to maintain its shape and integrity during operation of the PDE 10. For example, the detonation chamber 14 may be manufactured using, for example, inconel, steel, titanium, aluminum, brass, or copper fabricated alone or in combinations into light-weight, structural panels. The detonation chamber 14 may also include means to cool the interior walls of the chamber 14 (such as, for example air cooling fins, integral cooling passages to carry fuel or other fluids, etc.) to keep the temperature inside the chamber 14 well below the temperature at which the fuel and oxidizer inside the chamber 14 may ignite. The PDE 10, as discussed below, includes a device for admitting fuel and oxidizer into the transition section 16 and the detonation chamber 14 to produce a detonable fuel-air mixture inside a portion of the transition section 16 and detonation chamber 14. At the beginning of each cycle of the PDE 10, an un-fueled buffer of air is admitted into the detonation chamber 14 to separate the hot combustion products from the prior cycle from the detonable fuel-air mixture of the current cycle.

As shown in FIG. 1, the PDE 10 may, depending on the flight Mach number, include an engine nozzle 18 attached to the outlet (downstream) end of the detonation chamber 14. When required, PDE 10 preferably includes a divergent nozzle, through which the engine exhaust products traverse, providing additional expansion area, thereby producing additional thrust.

The operation of a PDE 10 is cyclic and, at the start of a cycle, the upstream, inflow end of the initiator tube 12 is closed (i.e., oxidizer valve 26 and fuel valve 24 are closed) and the spark plug 28 initiates a deflagration in the enhanced fuel mixture contained within the initiator tube 12. As the enhanced fuel mixture burns, the flame front is accelerated, pushed by the heated, expanding gas behind it. Eventually, a critical point in the acceleration process is reached, and the flame front jumps to a high supersonic speed, becoming a shock wave propelled by a coupled combustion zone. At this point in the cycle, the wave has become a detonation wave.

The detonation wave preferably eventually propagates through the initiator tube 14 and the transition section 16 and into the detonation chamber 14. The detonation wave processes all of the fuel-air mixture within the detonation chamber 14, resulting in high temperature, high pressure combustion gas, which expands, exhausting at high velocity, producing an impulse or thrust in a direction opposite to the exhaust.

The divergent transition section 16 is preferably designed to receive the detonation wave exiting from the initiator tube 12, expand the wave from the diameter of the initiator tube 12 to the diameter of the detonation chamber 14, and transition the wave into the detonation chamber 14. The divergent transition section 16 thus assists the high energy gas to exit the chamber 14 at a higher Mach number and, therefore, higher momentum, thereby increasing the impulse per pulse produced by PDE 10. Additionally, as discussed in detail below, the transition section 16 may also operate as the primary air valve permitting air and fuel to flow into the detonation chamber 14.

The shape and geometry of the transition section 16 is limited by the need to keep the detonation wave propagating. As is known, if the angle of divergence of the transition section 16 is too large, the detonation will degenerate into a subsonic deflagration and the PDE will cease to properly operate. However, if the angle of divergence is too small, the transition section 16 will be unnecessarily large. Preferably, the angle of divergence is maximized to reduce the overall engine weight, while remaining capable of properly transitioning and maintaining the detonation wave from the initiator tube 12 into the chamber 14.

Figure 3:
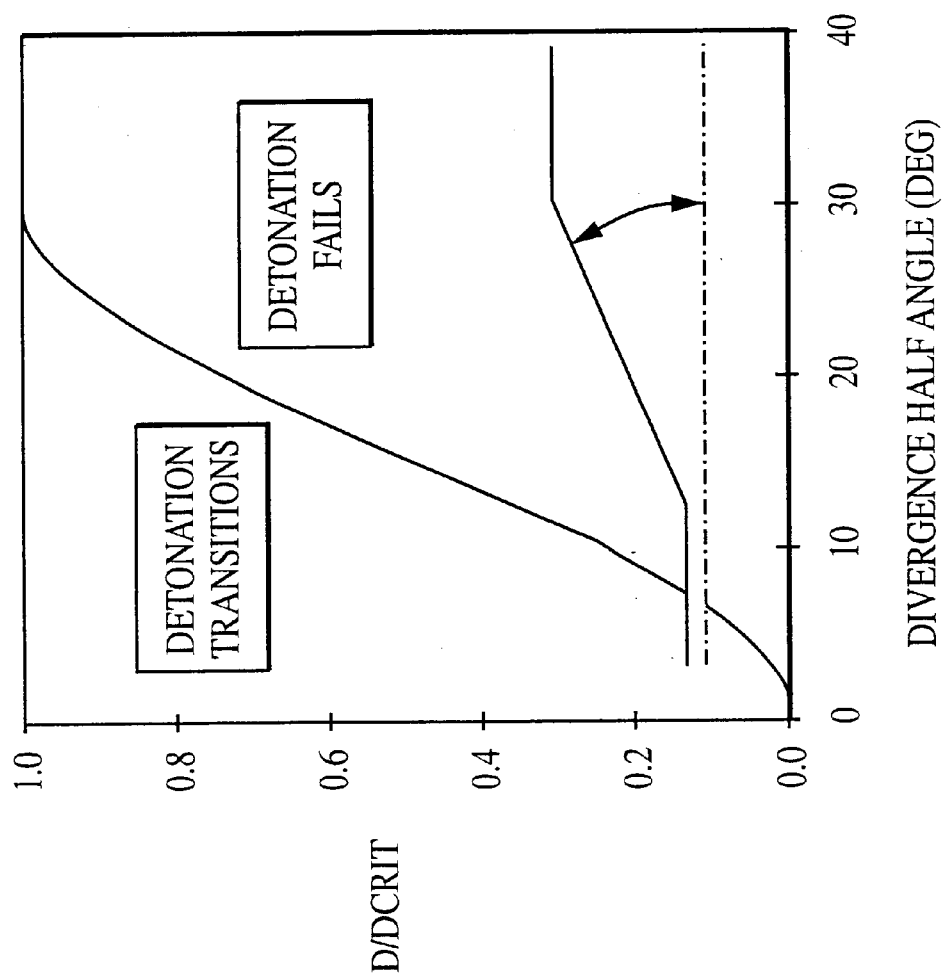
FIG. 3 is graph showing the preferred divergence rate of the inflow transition section as a function of the diameter of the initiator tube and the critical diameter of the enhanced fuel-oxidizer mixture contained within the initiator tube, in accordance with the Borisov criteria.

The shape (i.e., the rate of divergence) of the interior of the transition section 16 must be such that a detonation wave can successfully traverse from the initiator tube 12 into the detonation chamber 14. Referring now to FIG. 3, therein is shown a graph used-in calculating the preferred divergence angle of the interior of the transition section 16. This graph is based upon the prior work of A. A. Borisov (see, e.g., A. A. Borisov, S. V. Khomik, V. R. Mikhalkin, and E. V. Saneev, "Critical Energy of Direct Detonation Initiation in Gaseous Mixtures," International Colloquium on Dynamics of Explosions and Reactive Systems, 12th, Technical Papers of the American Institute of Aeronautics and Astronautics, Inc,. Vol. 133, pp. 142–155 (1991)). The horizontal axis represents the divergence half angle of the transition section 14 (i.e., the angle from the horizontal centerline of the transition section to the radius of the interior of the section). The vertical axis represents the normalized interior diameter of the initiator tube 12 (normalized by the critical diameter ($d_{crit}$) of the enhanced fuel mixture contained in the tube 12). Thus, this Borisov curve, as shown in FIG. 3, defines the proper divergence half angle of a simple conical transition section for a given initiator tube diameter and $d_{crit}$ for a given enhanced fuel and oxidizer mixture. For example, when the diameter of the interior of the initiator tube is 0.40 (normalized for the critical diameter of the enhanced fuel and oxidizer mixture), the permissible divergence half angle is approximately thirteen degrees. Using this graph, one may select a constant divergence angle for the transition section 16. However, this conventional method fails to account for the increasing diameter of the transition section (as compared to the diameter of initiator tube 12), which increases along the longitudinal axis of the transition section 16, when calculating the permissible divergence angle. In accordance with the present invention, a more aggressive approach may be taken by factoring in the increasing diameter of the transition section 16 to constantly increase the divergence angle of the transition section 16 along its length, resulting in a shorter transition section 16, which retains the ability to properly transition the detonation wave from the initiator tube 12 into the detonation chamber 14.

Figure 4:
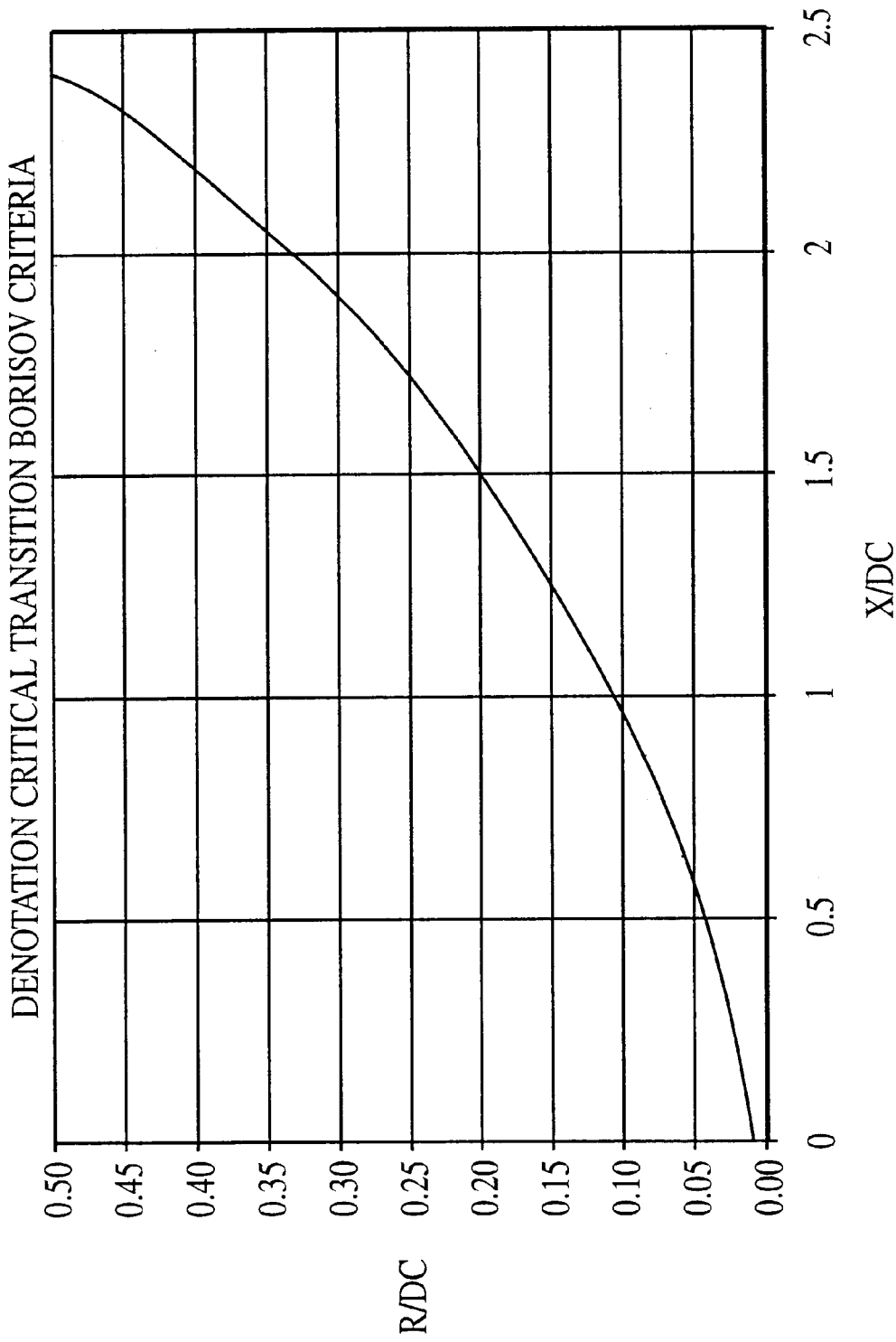
FIG. 4 is graph showing the contoured diverging shape of the presently preferred inflow transition section.

The preferred transition section 16 is designed based upon the original Borisov data presented in FIG. 3. Using conventional curve fitting principles applied to the Borisov data yields the function $D/D_{crit} = \{\sin[((2\theta/60)-1/2)\pi]+1\}/2$, where $\theta$ represents the divergence half-angle in degrees. Next, the preferred shape of the transition section 16 is determined by integrating the curve fit function over the length of the transition section, represented by x. Thus $dD/Dx = 2\tan(\theta)$ can be integrated and normalized to give $D/D_{crit}$ as a function of $x/D_{crit}$. This function, plotted in FIG. 4, gives the preferred transition contour, normalized by the critical diameter of the enhanced initiator mixture.

Thus, by integrating the curve fit function (derived based on the Borisov data points) over the length of the transition section, the divergence of the section may be preferably determined. The preferred divergent transition section 16 thus becomes trumpet-shaped along its length as shown in FIG. 4. Determination of the shape of the transition section 16 from the normalized transition contour of FIG. 4 proceeds with the identification of three physical diameters and two critical diameters. The physical diameters (or $$\text{effective diameters} = \sqrt{\frac{4A}{\pi}}$$

where A is the cross-sectional area) are the exit end of the initiator tube 12, the entry end of the chamber 16, and the interface between the enhanced initiator mixture and the fuel air mixture. This interface location is set by the forward extent of air inflow into the transition and chamber. Next, the normalized transition contour of FIG. 4 is scaled by the critical diameter using the enhanced initiator mixture resulting in the enhanced transition contour. The first part of the preferred transition contour is formed by the segment of the enhanced transition contour that lies between the effective initiator diameter and the effective interface diameter. The normalized transition contour is then scaled by the critical diameter using the fuel-air mixture resulting in the air transition contour. The second part of the preferred transition contour is formed by the segment of the air transition contour which lies between the effective interface diameter and the effective chamber diameter. When applied to axisymmetric configurations, this procedure produces the transition diameter distribution, D(x), of the preferred transition. This methodology can be applied to non-axisymmetric cross-sections by converting the resulting transition diameter distribution into an equivalent transition area distribution, $$A(x) = \frac{\pi D(x)^2}{4},$$

to be matched at each axial location by the non-axisymmetric cross-section. By using this presently preferred method, the length and volume of the transition section 16 is reduced so that the detonation wave may reach the useful thrust diameter (i.e., the diameter of the detonation chamber 14) as quickly as possible. Reducing the volume of the transition section 16 also reduces the amount of oxygen used in the enhanced fuel and air mixture.

The transition section 16 may also be configured to operate as the primary means for directing fuel and/or air into the detonation chamber 14. Thus, the surface (walls) of the transition section 16 may be configured to allow a fresh charge of air and/or fuel into the detonation chamber 14. As more of the surface area of the transition section 16 is used to allow oxidizer and/or fuel to flow into the detonation chamber 14, the time required to refresh the engine drops proportionately.

Figure 5A:
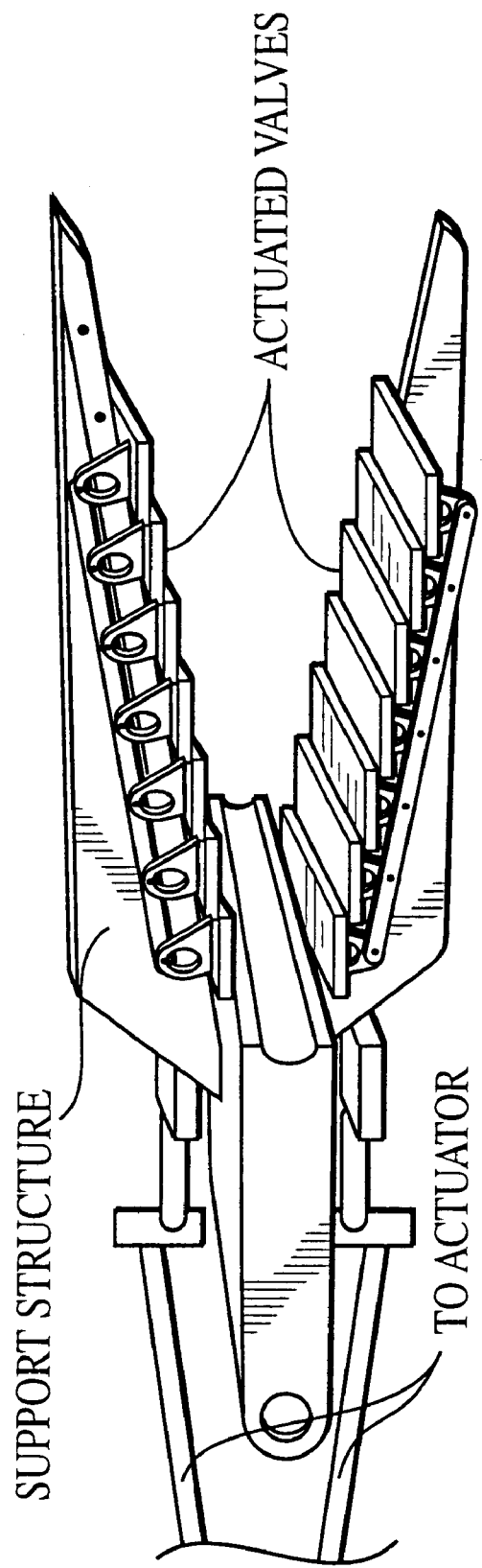
FIG. 5a is a diagrammatic illustration of one presently preferred version of the transition section of the pulsed detonation engine having a plurality of air and fuel ports shown therein.

In a preferred embodiment, as shown in FIGS. 5a and 5b, the transition section 16 comprises a pair of flat surfaces that form a divergent section by virtue of an acute angle between each surface and the longitudinal axis of the chamber. In a circular chamber, the platform of these divergent surfaces become semi-elliptical sections. Each of these sections has a plurality of ports in fluid communication with the sources of oxidizer and fuel, such as, for example, inflow valves 28 connected thereto to allow the refresh air and fuel charge to flow into the detonation chamber 14. The inflow valves 28 may be, for example, non-actuated, light-weight strips, mounted on a porous, supporting structure, or hinged blow-in doors. Preferably, the inflow valves 28 are normally open, using, for example, a spring, to permit the air and/or fuel to be injected from conventional supply sources into the detonation chamber 14. The valves 28 would then be closed by the high pressure of the detonation wave. The valves 28 may also be a tuned spring-mass system synchronized with the frequency of the engine. Through proper matching of the inertia of the valve body and the spring rate acting on the valve body, the valve may be tuned to oscillate at the engine operating frequency. Alternatively, the valves 28 may be actuated valves, controlled by a hydraulic, electromechanical, or mechanical means, such as, for example, a cam driven push rod system. Alternatively, the transition section 16 may include a number of aerodynamic diodes that permit flow into the interior of the transition section 16 and the detonation chamber 14 at low pressure and restrict the gas from flowing back out of the detonation chamber 14.

Additionally, transition section 16, as the primary engine aft-facing area, preferably operates as the primary thrust bearing surface for PDE 10. Thus, as the valves 28 close, the interior of the transition section 16 becomes sealed and may operate as a surface area that contains the high pressure gas wave developed behind the detonation wave. As the detonation wave transitions over the divergent transition section 16 into the detonation chamber 14, the inflow valves 28 advance into a second, closed position so that the closed valves 28 become thrust bearing surfaces and prevent gases from flowing back through the inflow valves 28. As the detonation wave propagates through the chamber 14, inflow valves 28 may preferably be maintained in their closed position, using either passive or active means. For example, the valves 28 may remain closed passively due to the increased air pressure behind the detonation wave. After the high pressure burned gas exits detonation chamber 14 and the pressure inside chamber 14 decreases, the pressure within chamber 14 is reduced to a sub-ambient level, creating a pressure drop across the front of the engine that, in conjunction with any inlet ram pressure, will draw in a fresh charge of air though the valved surface. During this refresh cycle, the valves 28 open to allow the next fresh charge to enter. Alternatively, valves 28 may be pulled and maintained opened or closed using, for example, a hydraulic actuator, an electro-mechanical actuator, or a mechanical actuator, such as, for example, a cam driven push rod, or a tuned spring-mass system that oscillates at the engine operating frequency.

In this preferred embodiment, when the inflow valves 28 are closed, the interior of the transition section 16 may preferably correspond to the desirable trumpet shape described above.

Figure 6A:
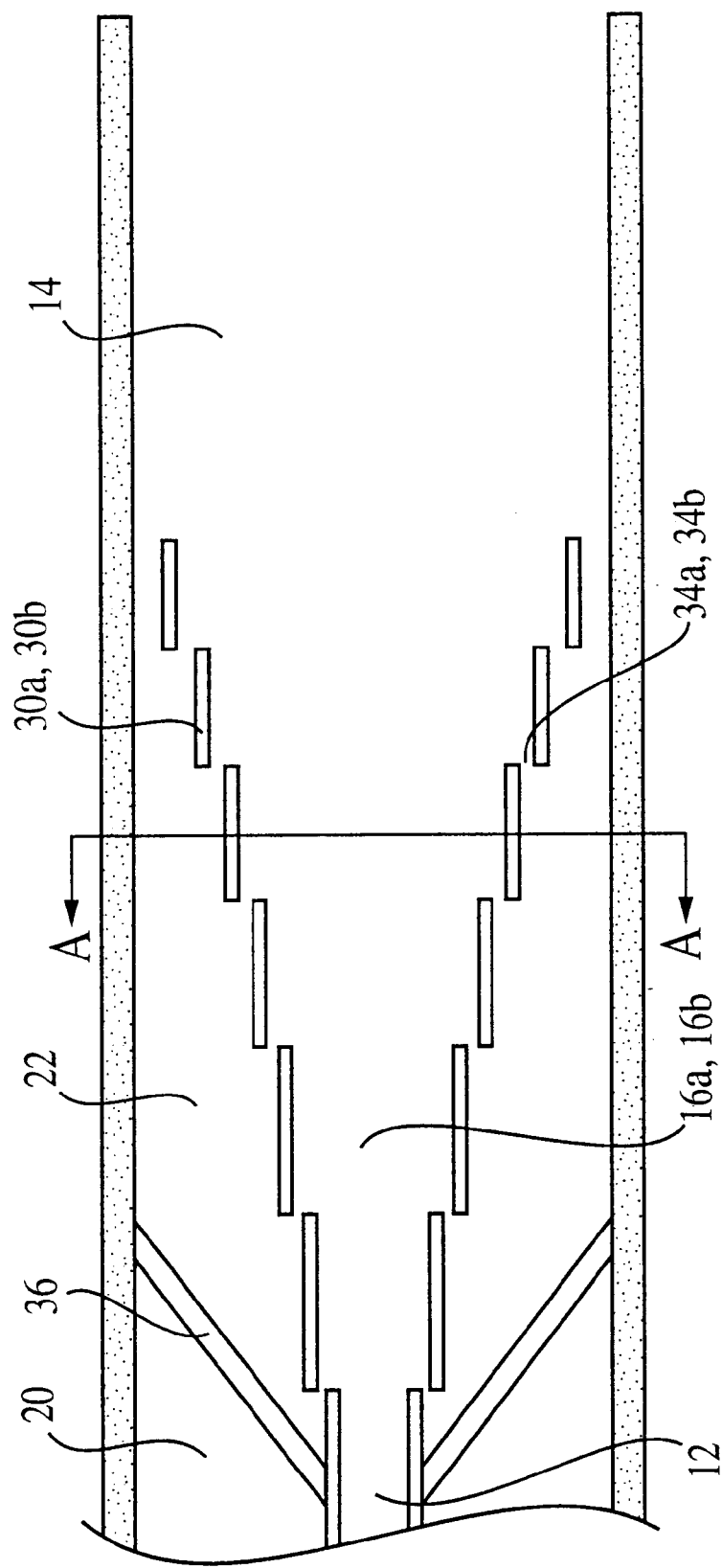
FIG. 6a is a diagrammatic illustration of a preferred stair-step transition section, which is either axisymmetric or two-dimensional.
Figure 6B:
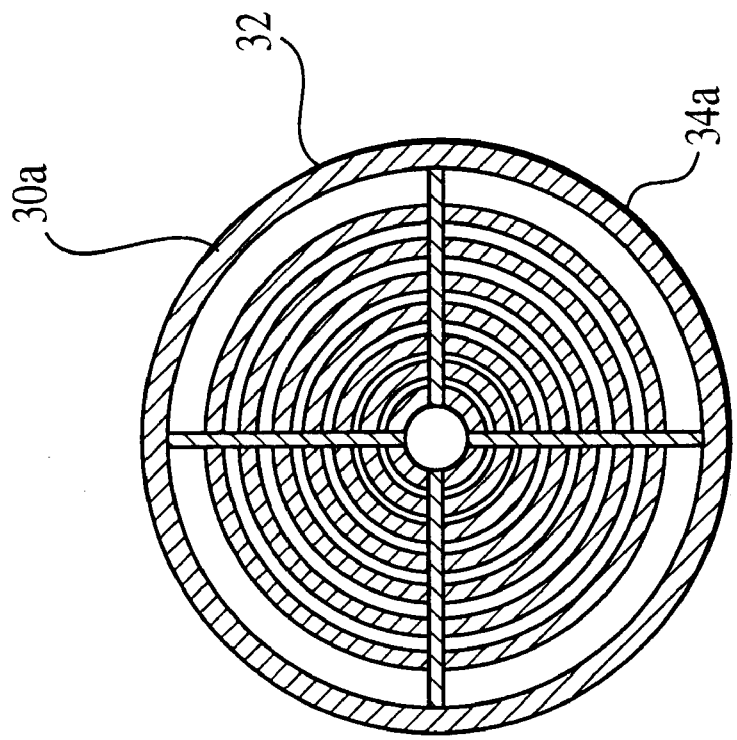
Figure 6B:
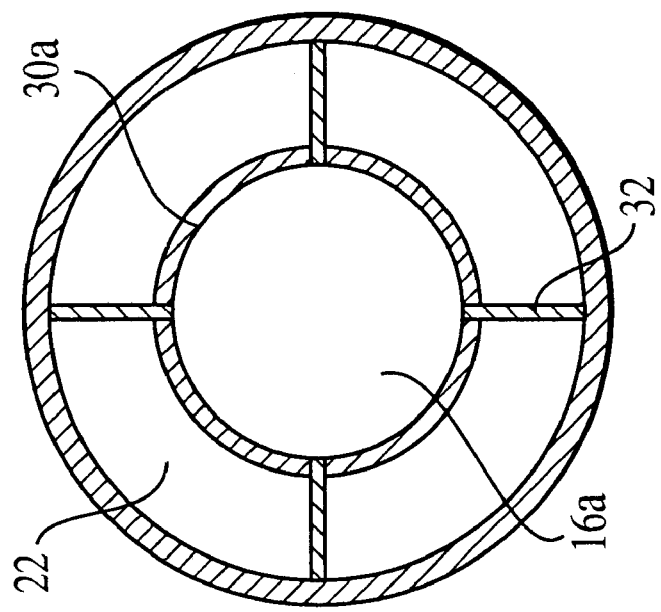
Figure 6C:
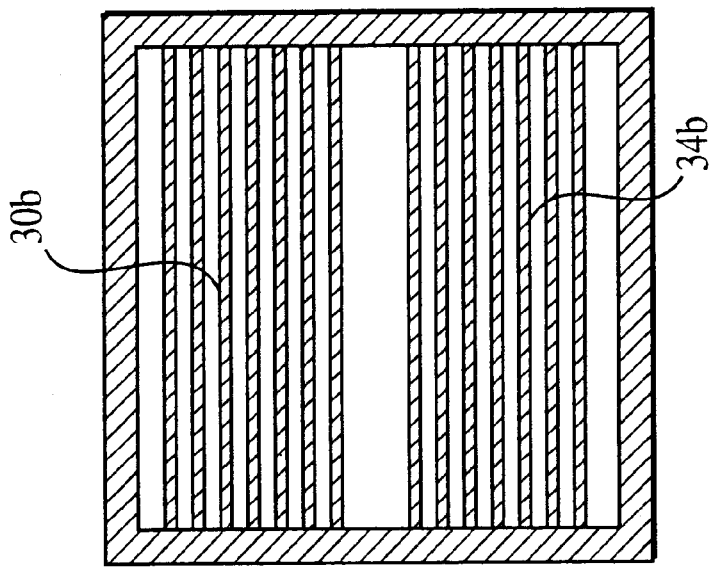
Figure 6C:
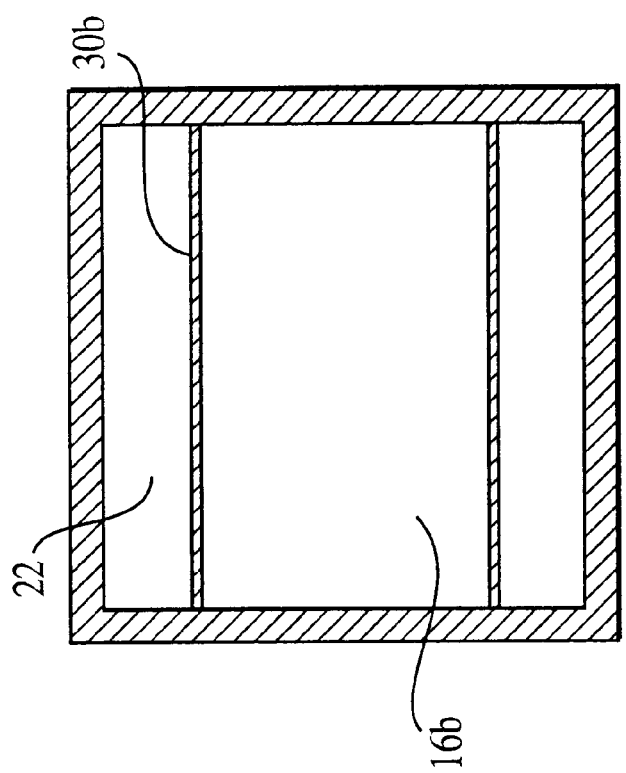

Referring now to FIGS. 6a, 6b, and 6c, therein is illustrated another embodiment of the PDE 10 wherein the divergent transition section 16 comprises a stepped transition section 16a over its interior surface area. As used herein, the term stepped divergent inflow transition section means a transition section having an interior with a stair-step configuration. In an axisymmetric embodiment, the transition section 16a comprises a plurality of concentric rings 30a, the interior diameters of which increase along the length of the stepped transition section 16a. The rings 30a provide a series of steps oriented such that the surfaces of the steps extend primarily along the longitudinal axis of the PDE 10, with each successive step displaced from the prior step primarily in the direction such that the flow path from the initiator tube into the detonation chamber increases in size. Each ring 30a is connected to the external wall of the PDE 10 using, for example, a strut 32 (as shown in FIG. 6b). Each ring 30a may be positioned closely to the neighboring ring 30a, thereby ensuring that the detonation wave readily propagates from ring to ring and through the stepped transition region 16a. However, preferably, in order to increase chamber air flow, the rings 30a may be separated from each other by an air gap 34a. The inner envelope of the stairstep transition (i.e. an imaginary, smooth curve which touches the inner, downstream corners of the rings 30a) preferably forms a trumpet-shaped contour as discussed above, but with the longitudinal axis scaled (e.g., by 1.3) to account for the steps and gaps of the stairstep. The air gap 34a should preferably be sized (e.g., one-eight inch) such that as the wave expands over the back of each step, it remains sufficiently strong to reestablish the detonation upon reflection on the next step. The gap 34a between the rings 30a also permits additional air to be directed into the detonation chamber 14 during the refresh cycle, thereby further decreasing the time to refresh the PDE 10.

In lieu of concentric rings, the stepped transition region 16a may be formed of two-dimensional steps 30b, as shown in FIG. 6c. This two-dimensional embodiment of the stair-step configuration (FIG. 6c) is similar to the axisymmetric embodiment (FIG. 6b). The inner envelope preferably forms a trumpet-shaped contour based on effective diameter, with the longitudinal axis scaled (e.g., by 1.3) to account for the steps 30b and air gaps 34b of the stairstep. The air gap 34b should be preferably sized (e.g., one-eighth of an inch) to allow the detonation wave to re-establish upon reflection on each step 30b. The air gap 34b between steps 30b also permits additional air to enter the chamber 14 during the refresh cycle.

Figure 7:
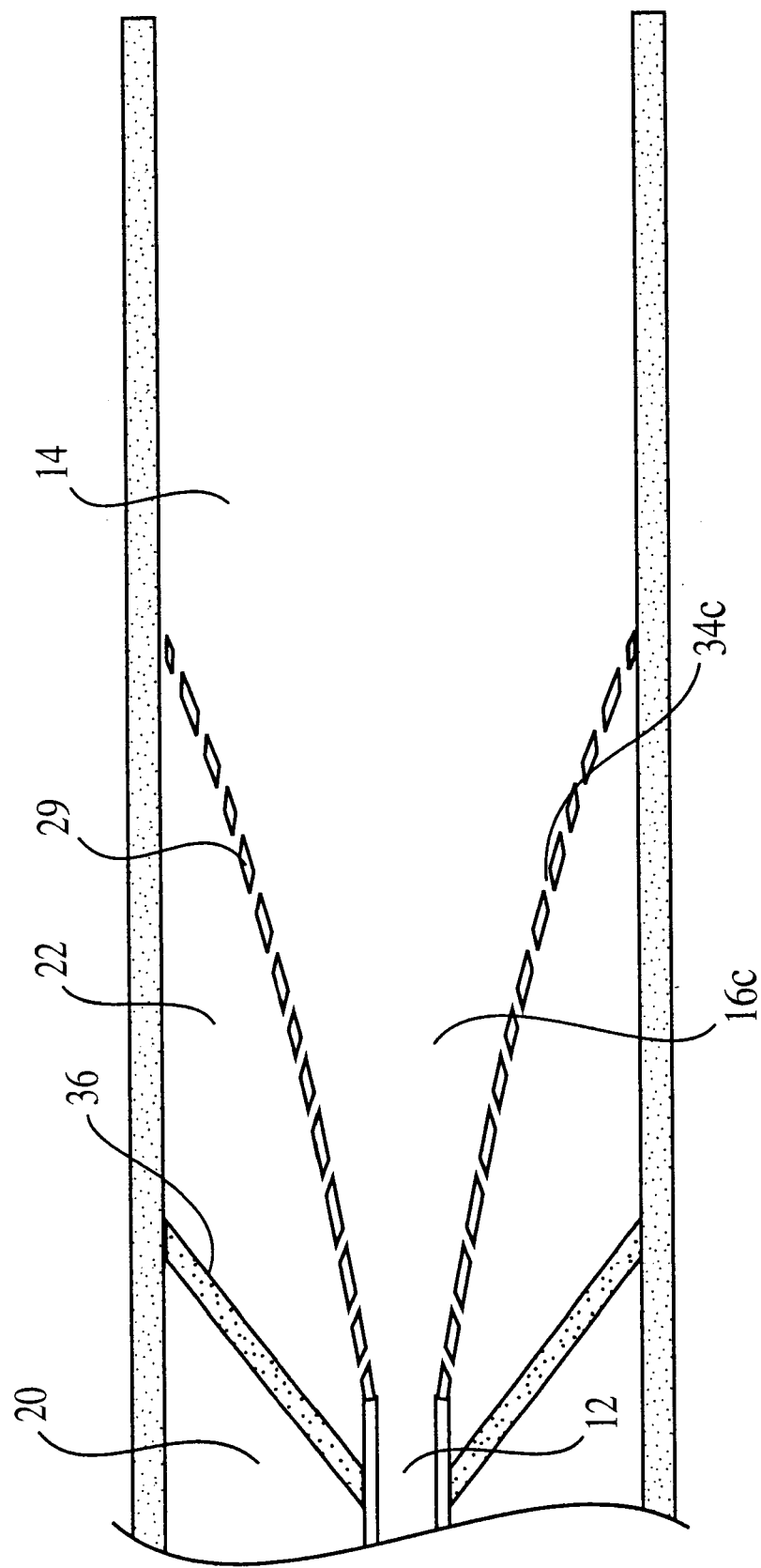
FIG. 7 is a diagrammatic illustration of a preferred porous transition section.

Referring now to FIG. 7, therein is illustrated another embodiment of the PDE wherein the divergent transition section 16c is porous over its interior surface area. As used herein, the term porous transition section means a transition section having a smooth interior with a plurality of passages, such as, for example, holes or slots 34c. The holes or slots 34c permit the flow of oxidizer or fuel-air mixture into the interior of the transition section 16 and the detonation chamber 14, and are sized and distributed to support the propagation of the detonation wave from the initiator tube 12 to the detonation chamber 14. The surface preferably forms a trumpet-shaped contour as discussed above, but with the longitudinal axis scaled (e.g., by 1.3) to account for the porous gaps or holes 34c. The contour and porous distribution are preferably selected to permit the detonation to propagate through the transition section 16c. The gaps or holes 34c also permit additional air to be directed into the detonation chamber 14 during the refresh-cycle, thereby further decreasing the time to refresh the PDE 10.

Using the preferred embodiments illustrated in FIGS. 6 and 7, a thrust bearing surface 36 is preferably positioned upstream of the stepped or porous transition region 16a, 16b, or 16c. Thrust bearing surface 36 may further include conventional valves (not shown) used to control the flow of oxidizer through the stepped transition region 16a or 16b or porous transition region 16c and into the detonation chamber 14.

Using these embodiments, divergent transition section 16, which is preferably constrained to that which a detonation wave can successfully traverse, does not limit the refresh flow area. These embodiments allow decoupling of the divergent transition section 16 from the valved inflow and thrust surfaces, providing more flexibility in the design of PDE 10. Additionally, the use of a divergent inflow transition section as fuel injection sources enables segmented fueling, providing benefits in engine specific fuel consumption, wall cooling, and throttling.

Preferably, the air and fuel used in the detonation chamber 14 is combined in the vicinity of the transition surface i.e., just prior to, during, or just after its passage through the transition surface (e.g., see reference 28 on FIG. 5b, 29 on FIG. 7, or 30a on FIG. 6a). Integrating the air and fuel in or near the transition section 16 results in certain advantages. Combining the fuel with the air in or near the location of detonation results in enhanced fuel/air mixture control and reduces the fuel penetration requirements (i.e., how far the fuel must travel). Additionally, integrating the air and fuel in or near the transition section 16 reduces the amount of unprocessed fuel potentially remaining in the inlet plenum 20 upstream and outside of the detonation chamber 14. Alternatively, for the stair-step (FIG. 6a) or the porous (FIG. 7) transition surfaces, the air and fuel used in the detonation chamber 14 may be combined in the vicinity of the thrust bearing surface 36 (i.e., just prior to, during, or just after its passage through valves in the thrust bearing surface 36). The air, thus fueled in the vicinity of the thrust bearing surface 36 proceeds through the openings in the transition surface 34a, 34b, or 34c to fill the transition section 16a, 16b, or 16c and chamber 14. The amount of fueled air in the pre-transition region 22 is preferably controlled by control of the fuel injection timing.

Figure 8:
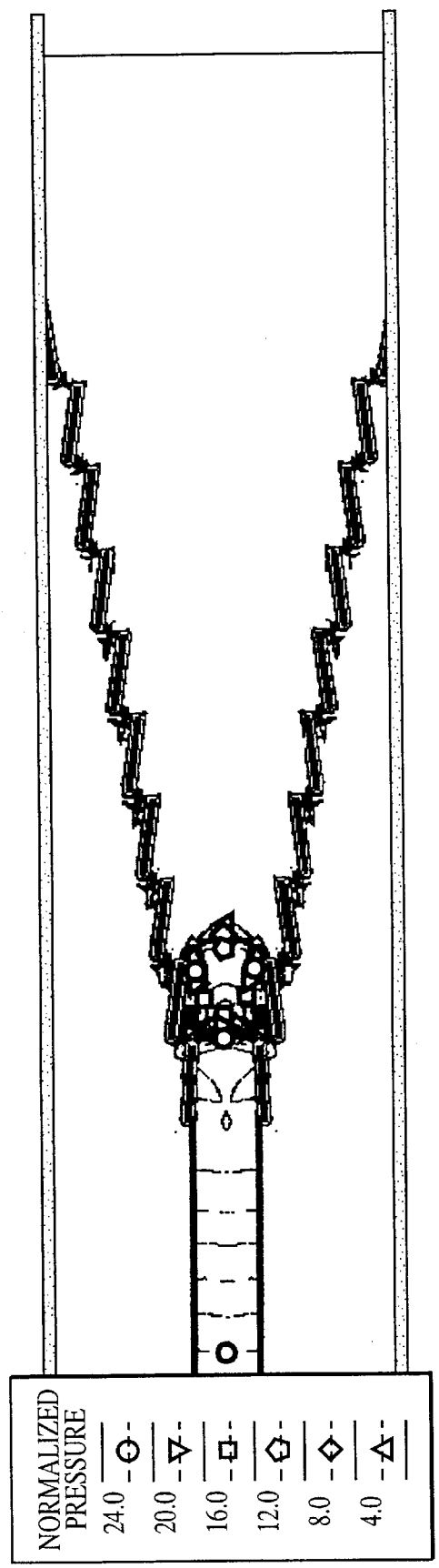
Figure 9:
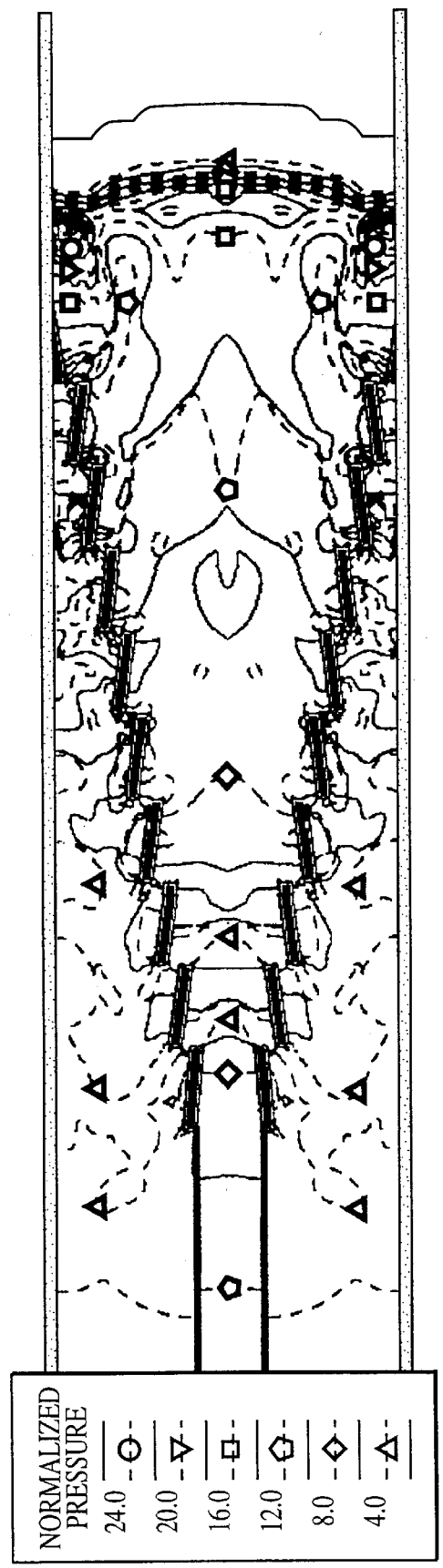

Referring now to FIGS. 8 and 9, therein is illustrated pressure contour plots generated from Computational Fluid Dynamics (CFD) analysis as the detonation wave enters the stepped transition region 16a (FIG. 8) and after the detonation wave has traversed the stepped transition region 16a (FIG. 9). The predicted pressure levels of FIG. 8 and the wave speed between FIGS. 8 and 9 are consistent with those of a detonation in this fuel/oxidizer mixture. Hence, the CFD analysis demonstrates that the detonation wave successfully negotiated the stepped transition region. That is, the stair-step region successfully transitioned an established detonation in a small diameter tube to a large diameter tube, thereby satisfying the critical PDE technical requirement of transition. These analyses were made by a finite volume code on the two-dimensional geometry shown and were run time accurate and inviscid using 3rd order Runge-Kutta time integration and 2nd order Roe flux averaging with min-mod total variation diminishing (TVD). The initial gas conditions were quiescent at standard pressure and temperature. The initiator was filled with a stoichiometric ethylene and enhanced oxidizer mixture, where the enhanced oxidizer consisted of 50% $O_2$ and 50% $N_2$. The transition and chamber were filled with a stoichiometric ethylene air mixture.

Figure 10:
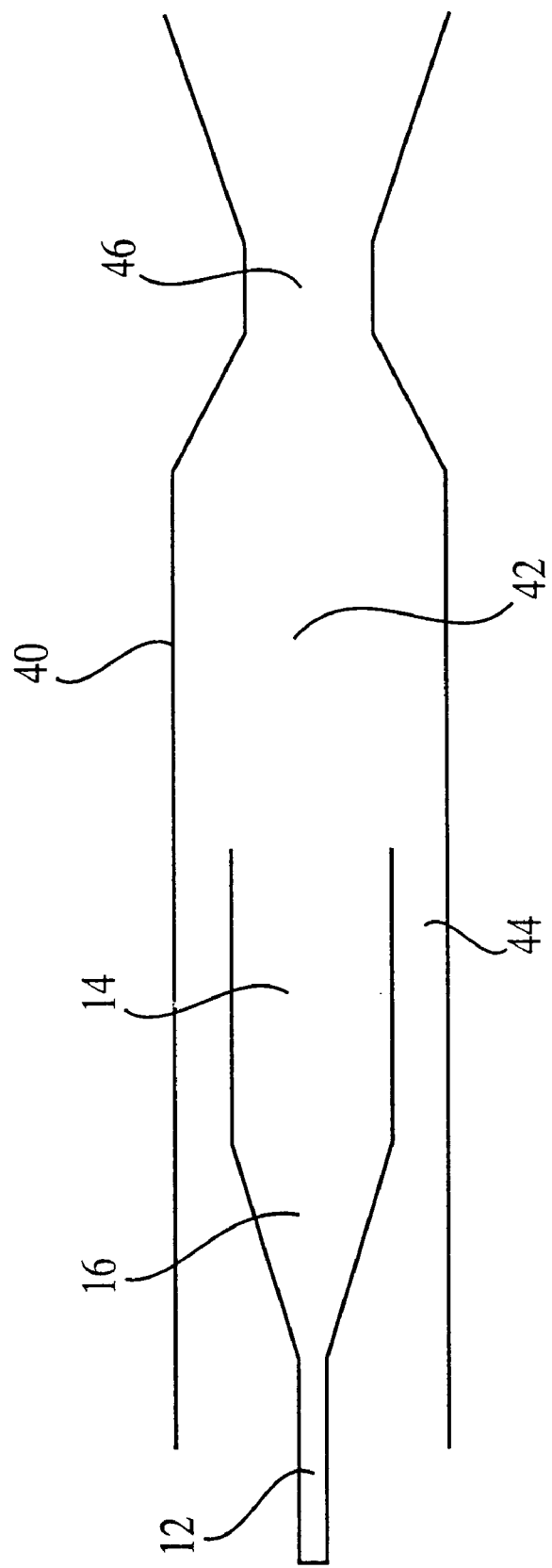
FIG. 10 is a diagrammatic illustration showing the presently preferred engine ejector/bypass in combination with the pulsed detonation engine.

Referring now to FIG. 10, therein is illustrated another preferred embodiment of PDE 10, having an engine ejector/bypass 40 surrounding the outlet end of the detonation chamber 14. The engine ejector/bypass 40 may preferably be used to convert more thermal energy of the PDE into thrust and to reduce the sound created by PDE 10. Preferably, the engine ejector/bypass 40 includes a mixing/bypass volume 42 (i.e., a volume of unfueled air) that is in fluid communication with the detonable mixture in the detonation chamber 14 and an air inlet 44 for feeding air from the inlet plenum to fill the mixing/bypass volume 42. The mixing/bypass volume 42 is preferably designed to capture the detonation engine exhaust and mix this exhaust with the ejector air generating a gas having a pressure and temperature lower than the pressure and temperature of the primary engine exhaust. The volume of ejector/bypass air is preferably compressed by and/or mixed with the detonable fuel-air mixture to transfer energy from the high pressure detonated gas to the unfueled volume of ejector/bypass air, thus increasing the amount of energy from the detonation wave that is converted into thrust.

The engine ejector/bypass 40 also preferably includes a nozzle 46, such as, for example, a divergent nozzle, located downstream from the outlet end of the detonation chamber through which the low pressure gas may be ejected. Use of a nozzle allows the engine ejector 40 to control the expansion of the mixed low pressure gas, converting more of the potential energy of the detonation engine exhaust into thrust. Acceptable nozzle expansion ratios are a function of flight speed and the amount of ejector/bypass air used. Typical expansion ratios vary from 1:1 for subsonic speeds to 3:1 for supersonic speeds.

Using the preferred embodiment of PDE 10 having engine ejector/bypass 40 (as shown in FIG. 10), more of the energy from the detonation may be converted to thrust. The hot engine exhaust products exiting the outlet end of detonation chamber 14 are combined in the mixing/bypass volume 42 of the engine ejector/bypass 40 with cooler ejector/bypass air, which flows into the mixing chamber through the air inlet 44, producing more mass flow at lower pressure and temperature. Because the exhaust starts at lower pressure and temperature, less latent thermal energy remains in the exhaust when it expands to ambient pressure. Thus, less energy is wasted, making the engine more thermally efficient. This gain in efficiency is analogous to the addition of a bypass air stream in conventional turbine engines. Thus, use of an engine ejector/bypass 40 results in more thermal energy being converted into thrust. Additionally, use of an engine ejector/bypass 40 reduces the magnitude of the detonation shock wave exiting the engine ejector/bypass 40, thus reducing the noise generated by the detonation engine.

Using the embodiment of the present invention that incorporates the engine ejector/bypass 40, at least two fueling arrangements are possible: serial and parallel. In a parallel fueling arrangement, illustrated in FIG. 11a, the fueled region 51 and the unfueled bypass region 52 lie parallel to each other and in fluid communication along the direction of detonation wave travel. In a preferred version of parallel bypass, fuel in the detonation chamber 14 is confined to the center of the chamber, away from its walls, resulting in lower gas temperature at the walls of the chamber 14. Cooler chamber walls allow for a reduction in the number of conventional cooling devices used in connection with the PDE 10, resulting in reduced overall weight. During operation of the PDE, the detonation wave will process the fueled region 51, shedding an aerodynamic compression that simultaneously compresses the unfueled region 52.

Figure 11A:
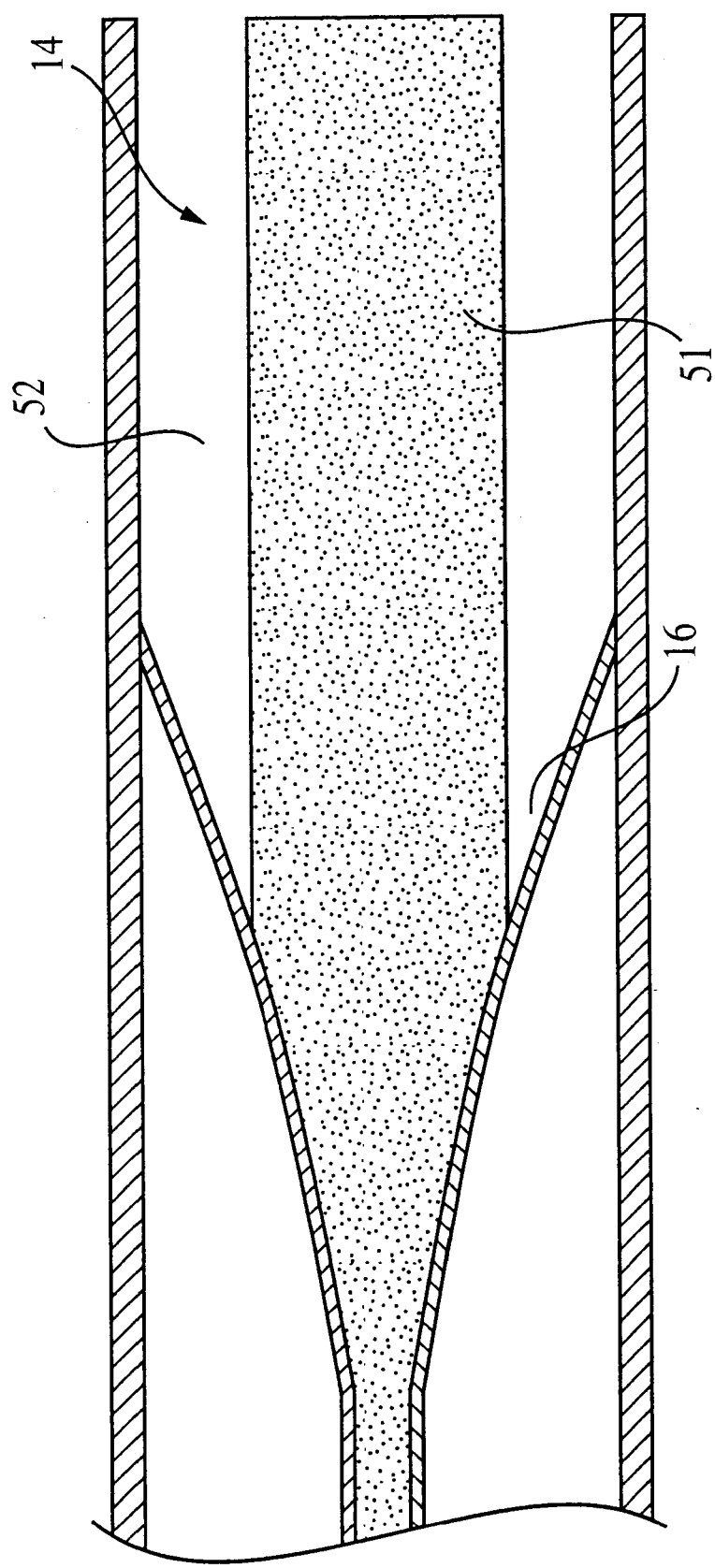
FIG. 11a is a representation of one embodiment of a parallel ejector/bypass in combination with the pulsed detonation engine.

In a preferred PDE 10 having a divergent inflow transition section 16 (as shown in FIGS. 5, 6, or 7) in combination with the engine ejector/bypass 40, and using a parallel fueling arrangement, fueling is preferably controlled radially. As shown in FIG. 11a, the fuel and air mixture is injected into the center region of the inflow transition section 16, while air is simultaneously injected through the portions of the inflow transition section 16 adjacent the interior walls of the detonation chamber 14. The air for the fuel/air mixture and for the bypass air may originate from the same source. Preferably, the fuel is injected to mix with the air near the surface of the inflow transition section 16 and is controlled, for example, by conventional fuel valves (not shown). This preferred fueling arrangement results in the core of the detonation chamber 14 being fueled with the detonable fuel air mixture, such mixture being surrounded, and separated from the walls of the chamber, by unfueled, ejector/bypass air, as illustrated in FIG. 11a. Thus, the unfueled volume of ejector/bypass air lies parallel to the longitudinal axis of the PDE 10 and is in fluid communication with the detonable fuel-air mixture and is compressed by a pressure balancing shock wave formed in the unfueled volume of ejector/bypass air as the detonation wave propagates along the detonation chamber 14.

The amount of air that is unfueled (bypass) relative to the amount fueled is dependent on flight speed and thrust requirements. Maximum speed and maximum thrust favor small amounts of bypass (e.g., 0 to 20% of fueled air). Lower speeds and cruise thrust favor large amounts of bypass air (e.g., 100% or 200% of fueled air).

Figure 11B:
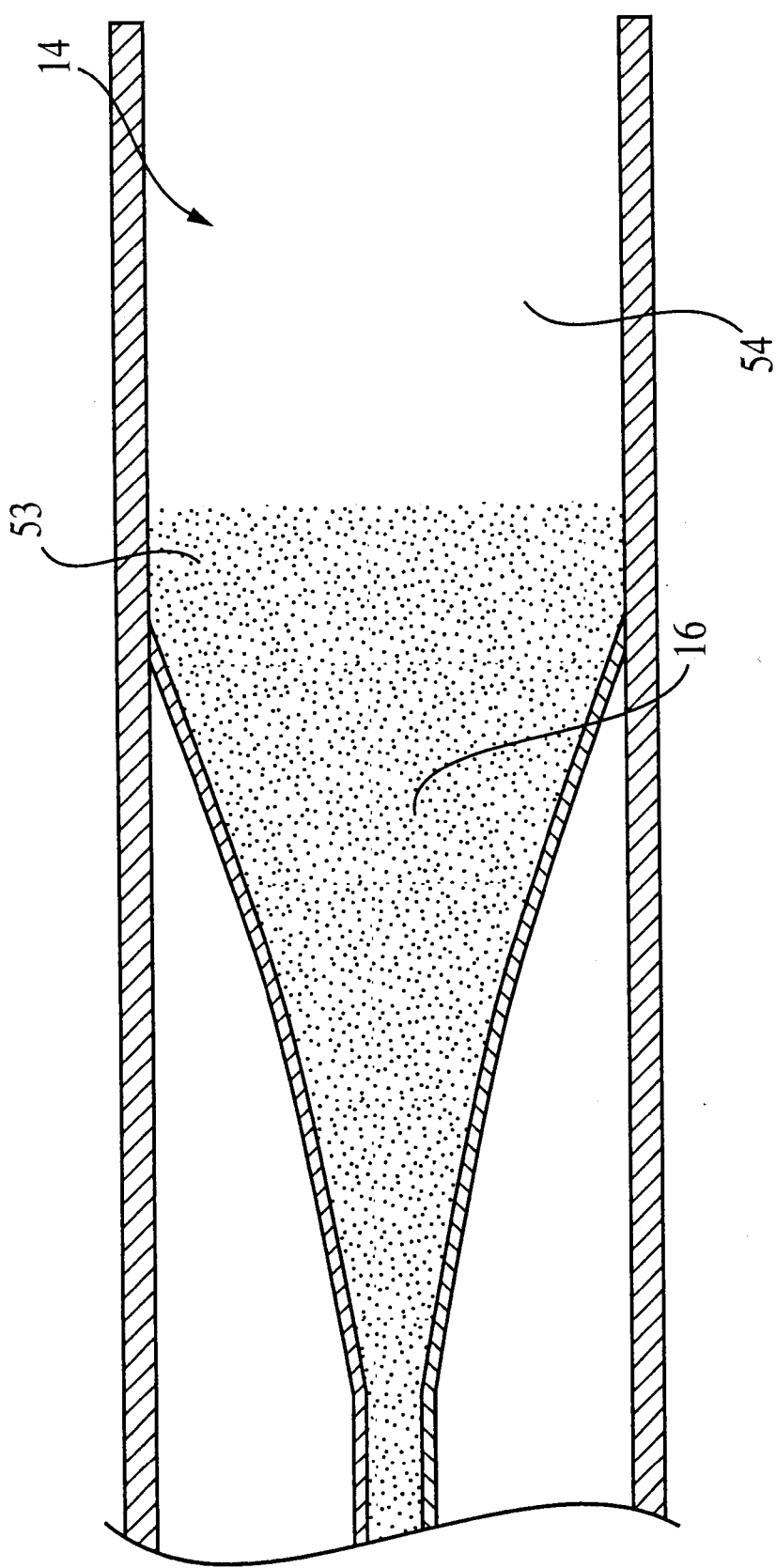
FIG. 11b is a representation of one embodiment of a serial ejector/bypass in combination with the pulsed detonation engine.

In contrast, in a serial fueling arrangement, shown in FIG. 11b, the fuel enters the upstream end of the detonation chamber 14 (through, for example divergent inflow transition section 16) and fills the entire cross-sectional area of the chamber as it flows into the detonation chamber 14, resulting in fueled region 53. Typically, the amount of fuel injected into the detonation chamber 14 using the serial technique is time-controlled. Thus, in order to increase the amount of fueled air in the detonation chamber 14, the fuel is permitted to flow into the chamber 14 for a longer period of time. Conversely, delaying the start of fueling increases the amount of ejector/bypass air in the chamber 14. Using a serial fueling arrangement, the unfueled bypass region 54 is compressed by a decaying shock wave formed in the unfueled volume of ejector/bypass air only after the detonation wave has completely processed the fueled region 53.

The determination of whether to use a parallel or serial fueling arrangement is preferably based on the particular application. For example, the parallel configuration tends to result in a slightly higher impulse per volume (increasing the thrust-to-weight ratio), improves the specific fuel consumption and results in cooler chamber walls, but is more difficult to implement. Of course, other fueling arrangements are possible including serial-expansion in which the cross-sectional size of the detonation chamber expands near its outlet end (similar to FIG. 10) and parallel-annulus (which is the inverse of the parallel fueling arrangement shown in FIG. 11a, i.e., the center core is unfueled, while the surrounding region near the walls is fueled).

Typically, detonation engines do not use conventional nozzles having throats because such devices tend to reflect the detonation wave and, therefore, decrease the engine thrust. However, without using a throat, the detonation engine will vent to ambient pressure. As is known, detonation is a pressure ratio phenomena and the pressure and resultant thrust will decrease as the chamber pressure decreases. This pressure and thrust loss will be severely detrimental to any air vehicle that must fly at higher altitudes.

Figure 12:
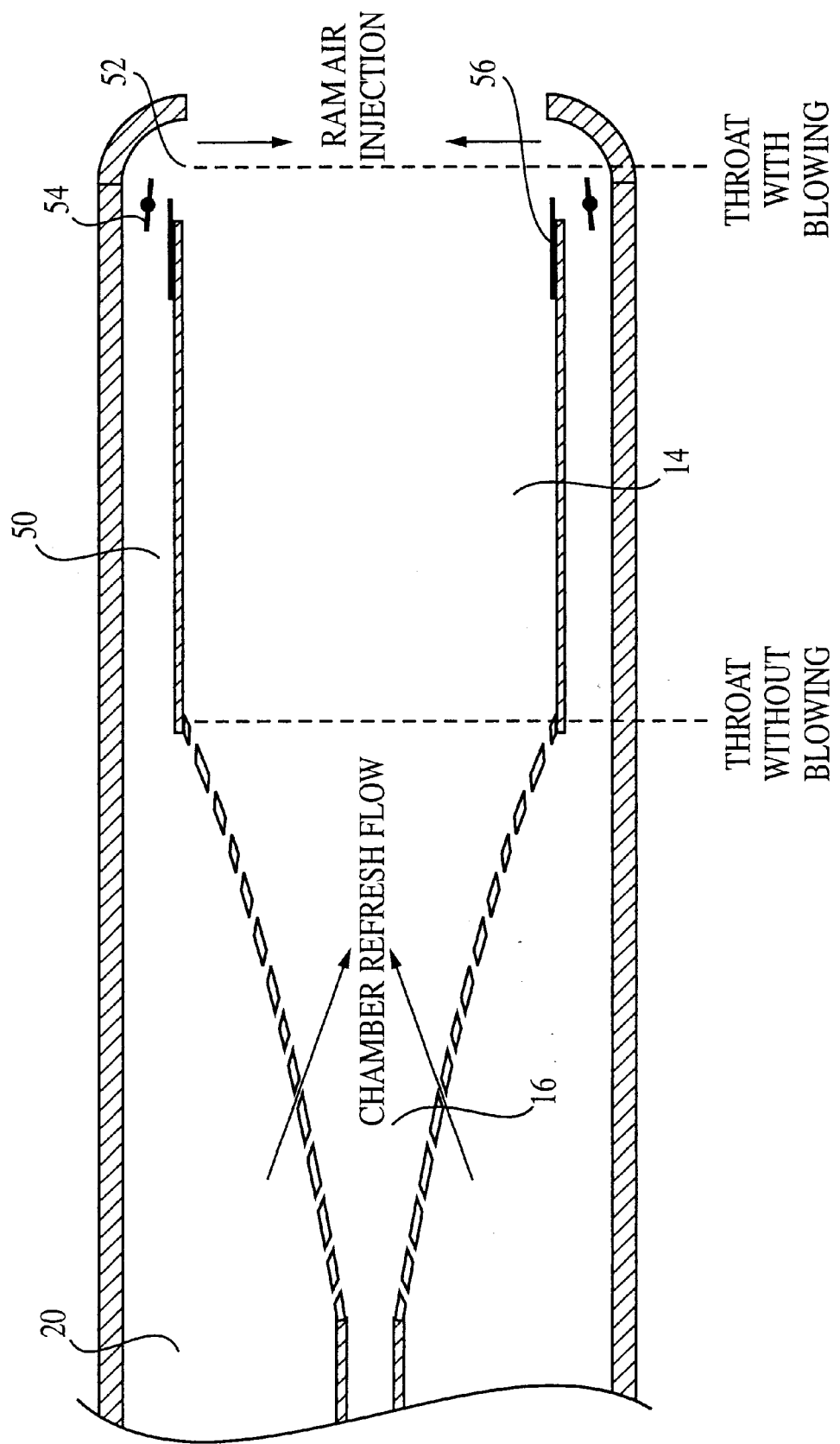
FIG. 12 is a representation of the one embodiment of the pulsed detonation engine showing the introduction of dynamic ram air at the outlet end of the detonation chamber.

Using a preferred PDE shown in FIGS. 5b, 6a, or 7 (which includes the use of a divergent inflow transition section) at supersonic flight conditions, the transition section may tend to act as an aerodynamic throat, which re-accelerates the subsonic refresh flow to supersonic speeds, with an accompanying reduction in pressure and loss of thrust in the detonation chamber 14. Thus, PDE 10 may further include a back pressure device to reduce the through flow velocity in the chamber, increasing the pressure of the gas in the detonation chamber prior to the detonation wave propagating through the detonation chamber. This, in turn, increases the pressure of the high pressure gas behind the detonation wave in the detonation chamber thereby increasing the thrust generated by the detonation engine. For example, PDE 10 may include a conventional mechanical throat (e.g., a convergent or convergent-divergent nozzle) as a back pressure device. However, preferably, as shown in FIG. 12, PDE 10 includes means for injecting dynamic pressure air near the outlet end of the detonation chamber such as a back pressure device having ducts 50, which channel air around the transition section 16 and the detonation chamber 14 and through aero-throat injection slots 52 located near the downstream, aft end of the detonation chamber 14.

The dynamic pressure air injected using a back pressure device effectively moves the aerodynamic throat location from the divergent transition section 16 to the location of the ram air injection, which in turn maintains higher pressures in, and resulting higher thrust levels generated by, the detonation chamber 14. As the detonation wave exits the detonation chamber 14, the high pressure would stop the aero throat flow, allowing rapid passage of the high pressure gas. As the chamber pressure is reduced during the refresh cycle, the aero throat flow preferably back pressurizes the engine to the desired pressure. The back pressure device also preferably controls the operating frequency of the PDE 10. At low engine exit pressures, the engine flow through speed, and thus the frequency, is high. Using a back pressure device to increase the exit pressure (for example, as the speed of the vehicle carrying the engine increases and the ram pressure increases), the pre-detonation pressure inside the detonation chamber 14 increases, resulting in a higher post-detonation pressure within the chamber. This higher pressure results in higher thrust for the same fuel/air mixture, lowering the specific fuel consumption.

Preferably, the amount of air flowing through the aero-throat injection slots 52 is controlled using a conventional throttling mechanism, such as, for example, a butterfly valve 54 or gate valve 56, which controls the size of the injection slots 52, preferably as a function of flight condition. For example, the valve would be closed at low altitude, low speed conditions, and open as speed and altitude increase to pass more ram air through the back pressure device.

Figure 13A:
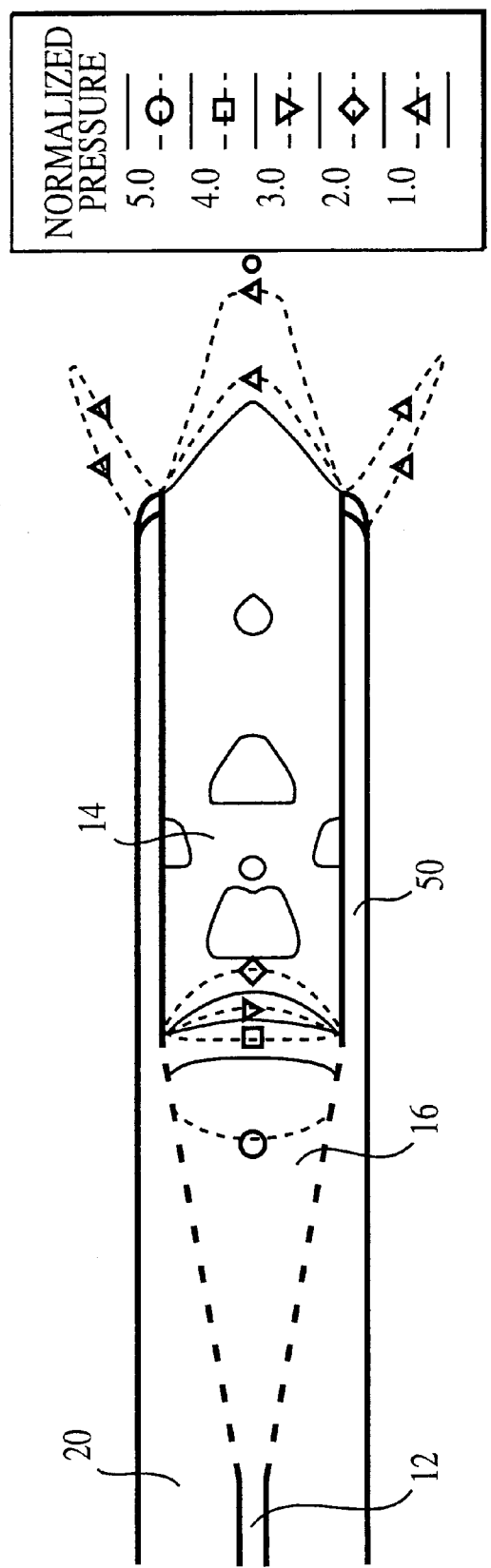
FIG. 13a is a plot of the results of a Computational Fluid Dynamics analyses of the preferred PDE illustrating pressure contours at supersonic freestream conditions without ram air injection.
Figure 13B:
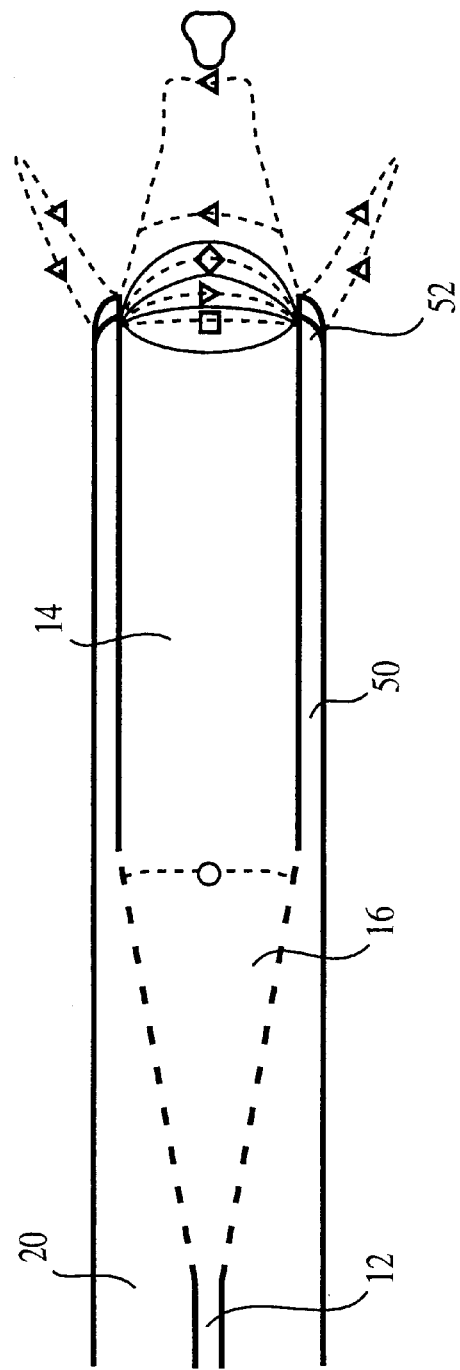
FIG. 13b is a plot of the results of a Computational Fluid Dynamics analyses of the preferred PDE illustrating pressure contours at supersonic freestream conditions with dynamic pressure air injection.

Computational Fluid Dynamics analysis of a preferred PDE with dynamic pressure air blowing to increase the pressure within the detonation chamber has been performed. Predicted pressure contours at supersonic freestream conditions without the ram air injection are provided in FIG. 13a, and pressure contours with the dynamic pressure air are shown in FIG. 13b. As shown in these two figures, the pressure within detonation chamber 14 is significantly increased with the addition of dynamic pressure air, providing increased thrust and efficiency. These analyses were made by a finite volume code on the axisymmetric geometry shown. They were run steady state and included the Baldwin-Barth turbulence model to capture boundary layer and mixing effects. The spatial operator was 2nd order Roe with min-mod TVD. Freestream conditions were Mach 2 at sea level.

Figure 14:
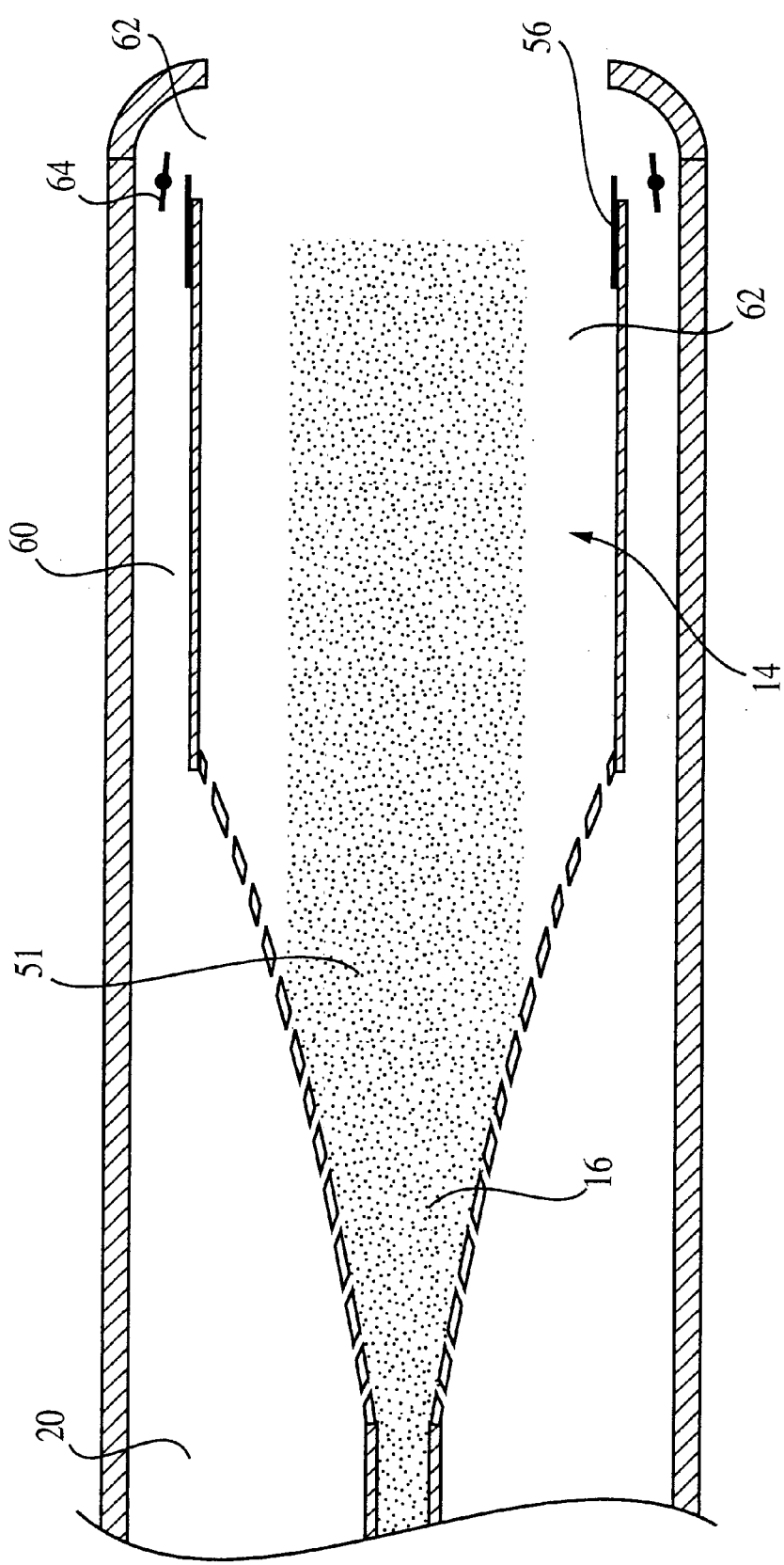
FIG. 14 is a diagrammatic illustration showing the presently preferred engine ejector/bypass in combination with a back pressure device.

As shown in FIG. 14, the PDE ejector/bypass may be combined with a back pressure device. This may be accomplished, for example, by surrounding the exit end of the detonation chamber 14 with an ejector/bypass volume 60 having a channel 62 designed to permit ram air to flow through injection slots 64 and into the interior of the ejector/bypass volume 60.

There are three preferred methods of throttling the pulsed detonation engine: reducing the fuel-to-air ratio of the mixture within the detonation chamber; reducing the fueled volume (which may be accomplished by increasing the bypass ratio of the chamber); and reducing the operational frequency of the engine. These three approaches each have varying effects on the specific fuel consumption of the engine and are constrained in different ways. The preferred throttling method simultaneously varies all three parameters to minimize the specific fuel consumption.

The first method of throttling the PDE 10 is to reduce the fuel-to-air ratio of the mixture within the chamber 14, reducing fuel flow faster than the thrust drops off, resulting in a reduced SFC. However, near an equivalence ration of 0.8, the mixture becomes unable to sustain a detonation, and another method of throttling must be used. The overall fuel to air ratio of the PDE 10 may also be preferably reduced by using a partially fueled PDE with an ejector/bypass configuration. As the fueled extent is decreased, the amount of bypass air increases. By continuing to decrease the amount of fuel, the SFC drops until a point at which net thrust starts dropping faster than fuel flow, at which point, SFC begins to rise again. This minimum SFC point will generally be a function of the specific flight conditions. Additionally, as discussed earlier, by raising the pressure near the exit end of the engine (using, for example, the previously described back pressure device), the operating frequency of the PDE 10 may be reduced. As the engine frequency decreases, the pre-detonation pressure of the chamber increases, resulting in an increase in the impulse per volume, which is inversely proportional to the SFC of the engine. Thus, reducing the frequency of the PDE 10 reduces its SFC.

Preferably, the three throttling methods are combined to minimize SFC by reducing the fuel to air ratio to an equivalence ratio of 0.8, reducing the fueled volume until only the transition section is fueled, and reducing the operating frequency of the engine by increasing the back pressure.

The presently preferred PDE offers many advantages over prior known devices. For example, the present invention increases the ability to introduce a detonation wave into the detonation chamber without adding oxygen to decrease the critical diameter of the enhanced fuel mixture in the chamber, while, at the same time, providing a path for efficient refresh flow and, therefore, high operating frequency. The preferred PDE also has increased thrust and fuel performance over prior known PDEs and has the ability to maintain its performance as the host aircraft or missile flies at a high speed and altitude.

Although the present invention has been described in considerable detail with reference to certain presently preferred versions thereof, other versions are possible without departing from the spirit and scope of the present invention. Therefore, the appended claims should not be limited to the description of the preferred versions contained herein.

We claim:

1. A pulsed denotation engine comprising:
   (a) an initiator tube fueled with a detonable, enhanced fuel-oxidizer mixture having an associated critical diameter, the tube having a length sufficient to accelerate a deflagration into a detonation;
   (b) a detonation chamber having a longitudinal axis and having an integral divergent inflow transition section and an open outlet end, the divergent inflow transition section having a first end in fluid communication with, and a diameter roughly equivalent to the diameter of, the initiator tube, and a second end in fluid communication with, and a cross section roughly equivalent to the cross section of, the interior of the detonation chamber, the divergent inflow transition section having a diverging shape extending from the first end to the second end that enables a detonation to transition from the initiator tube into the detonation chamber;
   (c) means for admitting an amount of un-fueled buffer oxidizer into the initiator tube and un-fueled buffer air into the transition section and the detonation chamber;
   (d) means for admitting fuel and oxidizer into the initiator tube, the transition section and the detonation chamber producing a detonable fuel-air mixture inside the initiator tube, the transition section and the detonation chamber;
   (e) means for igniting the enhanced fuel-oxidizer mixture contained within the initiator tube creating a deflagration propagating through the initiator tube and accelerating into a detonation wave being fueled by the enhanced fuel-oxidizer mixture, the detonation wave propagating through the initiator tube and transitioning over the divergent inflow transition section into the detonation chamber, the detonation wave being fueled by the detonable fuel-air mixture and propagating through the detonation chamber along its longitudinal axis and exhausting out the outlet end, wherein the detonation wave generates a high pressure gas behind the detonation wave that expands and produces thrust in a direction opposite to the exhaust; and
   (f) means for backpressuring the pulsed detonation engine at high speed or high altitude, thereby controlling the engine through flow velocity and engine cycle frequency, providing a higher pre-detonation pressure in the detonation chamber, thus increasing the impulse from each cycle of the engine.

2. The pulsed detonation engine of claim 1 wherein the means for backpressuring the pulsed detonation engine comprises a convergent nozzle.

3. The pulsed detonation engine of claim 1 wherein the means for backpressuing the pulsed detonation engine comprises a convergent-divergent nozzle.

4. The pulsed detonation engine of claim 1 wherein the means for backpressuring the pulsed detonation engine comprises means for injecting dynamic pressure air into the detonation chamber near the outlet end producing an aerodynamic throat.

5. The pulsed detonation engine of claim 4 wherein the means for injecting dynamic pressure air comprises:
   aero-throat injection slots located near the outlet end of the detonation chamber; and
   ducts for conducting the injected dynamic pressure air around the transition section and through aero-throat injection slots.

6. The pulsed detonation engine of claim 4 wherein the means for injecting dynamic pressure air comprises means for controlling the rate of flow of the injected pressure air.

7. The pulsed detonation engine of claim 6 wherein the means for backpressuring the pulsed detonation engine further comprises a convergent nozzle having a first end of minimum area and wherein the aero-throat injection slots open near the first end of the convergent nozzle.

8. The pulsed detonation engine of claim 6 wherein the means for backpressuring the pulsed detonation engine further comprises a convergent-divergent nozzle having a first end of minimum area and wherein the aero-throat injection slots open near the first end of the convergent-divergent nozzle.

\* \* \* \* \*